(12) United States Patent
Rajasekaran et al.

(10) Patent No.: US 12,229,084 B2
(45) Date of Patent: *Feb. 18, 2025

(54) REBALANCING ENGINE FOR USE IN REBALANCING FILES IN A DISTRIBUTED STORAGE SYSTEMS

(71) Applicant: NetApp, Inc., San Jose, CA (US)

(72) Inventors: Umeshkumar Vasantha Rajasekaran, Cranberry Township, PA (US); Glenn Cook, Pittsburgh, PA (US); Rajavardhan Mallepally, Aubrey, TX (US); Brett Sander, Pittsburgh, PA (US); Wenxin Zhou, Vancouver (CA)

(73) Assignee: NetApp, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/194,860

(22) Filed: Apr. 3, 2023

(65) Prior Publication Data

US 2024/0061807 A1 Feb. 22, 2024

Related U.S. Application Data

(60) Provisional application No. 63/399,598, filed on Aug. 19, 2022.

(51) Int. Cl.
  *G06F 16/13* (2019.01)
  *G06F 16/14* (2019.01)
  (Continued)

(52) U.S. Cl.
  CPC .......... *G06F 16/134* (2019.01); *G06F 16/148* (2019.01); *G06F 16/16* (2019.01);
  (Continued)

(58) Field of Classification Search
  CPC ...... G06F 16/134; G06F 16/16; G06F 16/183; G06F 16/148; G06F 16/1734
  See application file for complete search history.

(56) References Cited

U.S. PATENT DOCUMENTS

| | | |
|---|---|---|
| 7,984,259 B1 | 7/2011 | English |
| 9,223,500 B1 | 12/2015 | Lemar et al. |

(Continued)

OTHER PUBLICATIONS

Co-pending U.S. Appl. No. 18/193,707, inventors Bare; Keith Allen et al., filed on Mar. 31, 2023.

(Continued)

*Primary Examiner* — Baoquoc N To
(74) *Attorney, Agent, or Firm* — Jaffery Watson Hamilton & DeSanctis LLP

(57) ABSTRACT

Redistribution of files in a containerized distributed file system is disclosed. Containers each have an engine and a scanner and each of the containers stores files and parameters for characteristics of files stored on the container. A first engine in a first container monitors characteristics of files stored on the first container and, responsive to determining that the parameters for files on the first container exceed one or more predetermined thresholds, communicates with a second engine in a second container to determine a destination container for one or more files from the first container. The second engine in the second container indicates to the first engine in the first container whether the second container is available to receive one or more files from the first container. The first engine triggers file system scanning by the scanner of the first container to identify files to be moved to the second container.

20 Claims, 14 Drawing Sheets

(51) Int. Cl.
  *G06F 16/16* (2019.01)
  *G06F 16/17* (2019.01)
  *G06F 16/182* (2019.01)
  *G06F 16/27* (2019.01)
  *H04L 67/1029* (2022.01)

(52) U.S. Cl.
  CPC ........ *G06F 16/1734* (2019.01); *G06F 16/183* (2019.01); *G06F 16/27* (2019.01); *H04L 67/1029* (2013.01)

(56) References Cited

U.S. PATENT DOCUMENTS

| | | | |
|---|---|---|---|
| 9,465,820 B2 * | 10/2016 | Singh | .................... G06F 16/27 |
| 9,813,353 B1 | 11/2017 | Suit | |
| 9,934,241 B2 | 4/2018 | Duval et al. | |
| 10,331,627 B2 * | 6/2019 | Singh | .................... G06F 16/178 |
| 12,105,679 B2 | 10/2024 | Bare et al. | |
| 2004/0268244 A1 | 12/2004 | Levanoni et al. | |
| 2009/0006402 A1 | 1/2009 | Bohle et al. | |
| 2009/0300169 A1 | 12/2009 | Sagar et al. | |
| 2010/0023631 A1 | 1/2010 | Archer et al. | |
| 2012/0124092 A1 | 5/2012 | Teranishi et al. | |
| 2013/0339645 A1 | 12/2013 | Barve et al. | |
| 2014/0201145 A1 | 7/2014 | Dorman et al. | |
| 2014/0298116 A1 | 10/2014 | Bodmer et al. | |
| 2015/0134703 A1 * | 5/2015 | Singh | .................... G06F 16/178 |
| | | | 707/803 |
| 2016/0026652 A1 | 1/2016 | Zheng | |
| 2016/0292047 A1 | 10/2016 | Bender et al. | |
| 2016/0350328 A1 * | 12/2016 | Singh | .................... G06F 16/21 |
| 2017/0315838 A1 | 11/2017 | Nidugala et al. | |
| 2018/0157671 A1 | 6/2018 | Eda et al. | |
| 2019/0220297 A1 | 7/2019 | Rao et al. | |
| 2023/0112569 A1 | 4/2023 | Blom et al. | |
| 2024/0296147 A1 | 9/2024 | Bare, II et al. | |

OTHER PUBLICATIONS

U.S. Appl. No. 18/194,874, filed Apr. 3, 2023, Rajasekaran et al.
Non-Final Office Action mailed on Apr. 4, 2024 for U.S. Appl. No. 18/194,874, filed Apr. 3, 2023, 24 pages.
Non-Final Office Action mailed on Mar. 7, 2024 for U.S. Appl. No. 18/193,707, filed Mar. 31, 2023, 07 pages.
Notice of Allowance mailed on May 29, 2024 for U.S. Appl. No. 18/193,707, filed Mar. 31, 2023, 7 pages.
Final Office Action mailed on Dec. 12, 2024 for U.S. Appl. No. 18/194,874, filed Apr. 3, 2023, 28 pages.
Non-Final Office Action mailed on Nov. 20, 2024 for U.S. Appl. No. 18/661,835, filed May 13, 2024, 32 pages.

* cited by examiner

REBALANCING ENGINE FOR USE IN REBALANCING FILES IN A DISTRIBUTED STORAGE SYSTEMS

CROSS-REFERENCE TO RELATED APPLICATIONS

This application claims the priority of U.S. Provisional Application No. 63/399,598, filed Aug. 19, 2022, the contents of which are incorporated by reference herein.

This application is related to U.S. patent application Ser. No. 18/194,874, filed Apr. 3, 2023, entitled "REBALANCING SCANNER FOR USE IN REBALANCING FILES IN A DISTRIBUTED FILE SYSTEMS" by Umeshkumar Vasantha Rajasekaran, et al.

BACKGROUND

A node, such as a server, a computing device, a virtual machine, etc., may host a storage operating system. The storage operating system may be configured to store data on behalf of client devices, such as within volumes, aggregates, storage devices, cloud storage, locally attached storage, etc. In this way, a client can issue a read operation or a write operation to the storage operating system of the node in order to read data from storage or write data to the storage. The storage operating system may implement a storage file system through which the data is organized and accessible to the client devices. The storage file system may be tailored for managing the storage and access of data within hard drives, solid state drives, cloud storage, and/or other storage that may be relatively slower than memory or other types of faster and lower latency storage.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
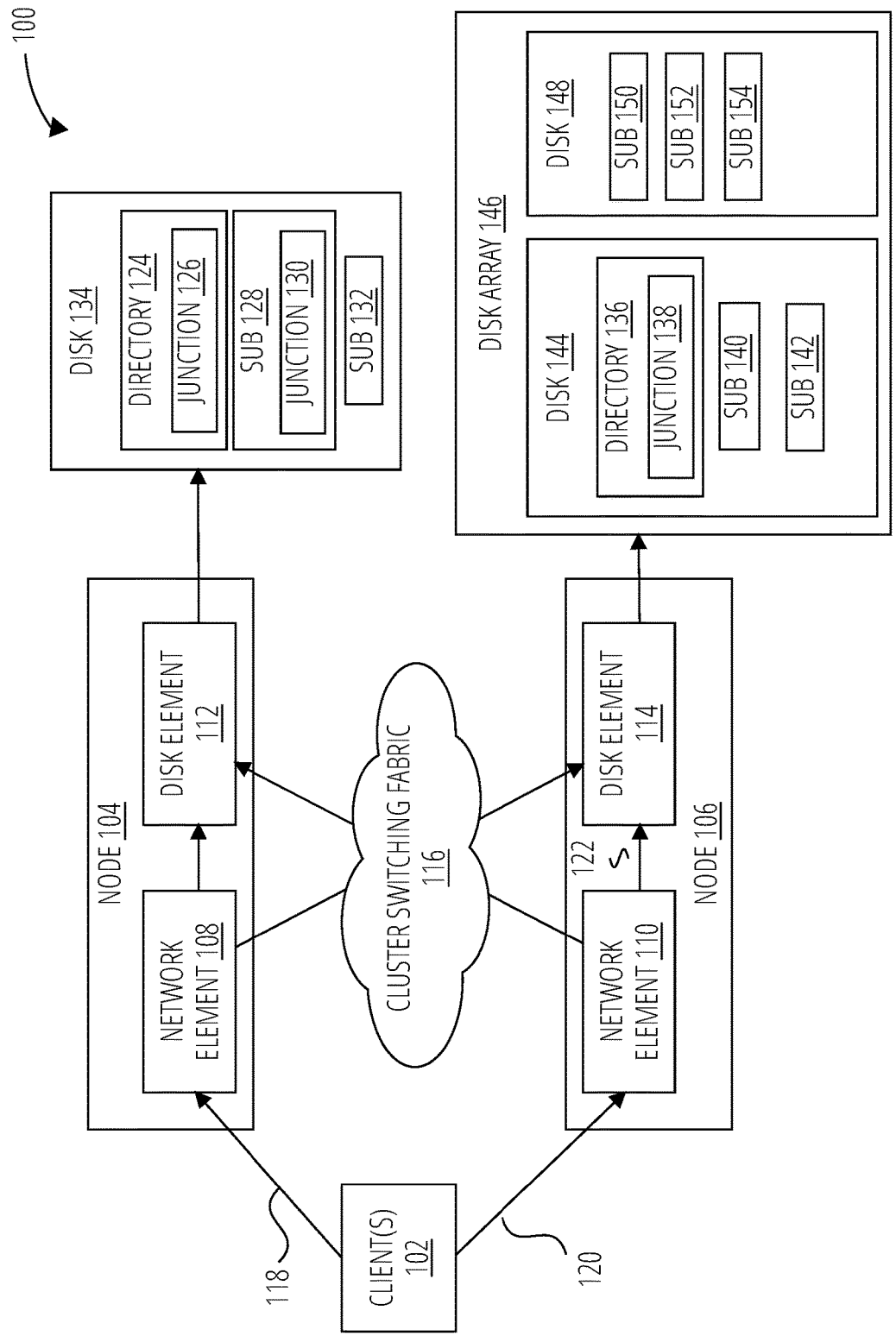
FIG. 1 illustrates one embodiment of block diagram of a plurality of nodes interconnected as a cluster.

In the following description, for the purposes of explanation, numerous specific details are set forth in order to provide a thorough understanding of the present disclosure. It will be apparent, however, to one skilled in the art that the present disclosure may be practiced without some of these specific details. In other instances, well-known structures and devices are shown in block diagram form to avoid obscuring the underlying principles of the present disclosure.

In a distributed file system file placement is initially performed via implementation of one or more heuristics that provide an optimal placement of newly created files throughout the distributed system. For example, when a command is received to create a new data container (e.g., a subdirectory) in a distributed file system, a remote access module performs a first heuristic procedure to determine whether the new subdirectory should be created locally (e.g., on a flexible volume associated with a physical node executing the command), or whether the subdirectory should be created remotely (e.g., on a flexible volume associated with a node not directly attached to the node generating the command). If the subdirectory is to be created remotely, a second heuristic procedure may be performed to determine which remote flexible volume should hold the new subdirectory. The second heuristic procedure then selects the remote flexible volume. The subdirectory is then created on the identified remote flexible volume.

However, over time factors such as file size and file operations (fileop) load may change to such a degree that the original placement may become sub-optimal. Thus, according to embodiments, mechanisms are provided to automatically rebalance file distribution and non-disruptively move files within the distributed file system to more accurately reflect an optimal distribution.

According to various examples described herein, rebalancing of files within the distributed file system can be accomplished by utilizing one or more of three components: 1) a rebalancing engine; 2) a rebalancing scanner; and 3) a non-disruptive file movement subsystem. The rebalancing engine, which is described in greater detail below, analyzes the state of the distributed file system and drives file movement. The rebalancing scanner, which is described in greater detail below, scans files to find acceptable file candidates for movement within the distributed file system. The non-disruptive file movement subsystem moves selected files within the distributed file system without client interruption.

In various examples, file rebalancing can be driven by the rebalancing engine. In a containerized environment, each container has its own rebalancing engine that has responsibility for monitoring the files of the container and make decisions on whether files should be moved from one container to another. In an example, each rebalancing engine monitors a constantly refreshed, shared set of data that reflects the overall state of the distributed file system.

When a rebalancing engine determines that its container should move files, that rebalancing engine drives the workflow of the file movement(s). In an example, in order to move one or more files, a rebalancing engine can invoke one or more rebalancing scanners to identify one or more files to be moved.

The rebalancing scanner is responsible for performing potentially a full file system scan on its local container to search for acceptable file candidates to move. In an example, this scanning operation occurs in response to a trigger or other indication from the rebalancing engine of the container. In an example, as the rebalancing scanner encounters files it performs a deep inspection of the file metadata was well as the individual file blocks to determine if the file is an acceptable candidate for movement.

Various conditions, metrics and/or parameters can be utilized to determine if a file is an acceptable candidate for movement. Possible reasons for not being an acceptable candidate includes, for example, certain file types, whether the file is part of a snapshot, states of the file and/or various metrics that determine that moving the file would not result in a substantial enough improvement of the distributed file system. If a file is determined to e an acceptable candidate, it can be added to an ordered, queryable database that the rebalancing engine can use to find appropriate candidates to move. The rebalancing scanner can be driven multiple times for various reasons as the search for acceptable file candidates continues.

Once the rebalancing engine receives one or more file candidates from the database, the rebalancing engine can drive the movement of files between containers using the non-disruptive file movement sub-system and adjust local container information. In this manner, the rebalancing engine and rebalancing scanner can operate to rebalance files within the distributed file system. In an example, the process can continue until the distributed file system has been sufficiently rebalanced or a user-specified runtime (or other parameter) has been accomplished.

With respect to the example rebalancing operations described herein, various parameters and characteristics are utilized in the rebalancing process. Specifically:

"Optimal Usage Size" refers to a preselected usage level corresponding to a storage capacity of a container. For example, the Optimal Usage Size can be 73% of available capacity of the container. Many other alternative values can be utilized as the Optimal Usage Size (e.g., 75% of available capacity of the container, 65% of available capacity of the container, 85% of available capacity of the container, 83% of available capacity of the container, 67% of available capacity of the container).

"Current Usage Size" refers to current storage capacity utilized by a container. The current storage capacity can be measured by any combination of components having the functionality required to measure storage utilization. The current storage capacity information is accessible by at least the rebalancing engine of the local container. In some examples, the storage capacity information can be shared with entities that are external to the local container.

"Maximum Usage Size" refers to a storage capacity value that is greater than the Optimal Usage Size and is used to trigger rebalancing operations. For example, the Maximum Usage Size can be 25% greater than the Optimal Usage Size. Many other alternative values can be utilized as the Maximum Usage Size (e.g., 20% greater than the Optimal Usage Size, 23% greater than the Optimal Usage Size, 33% greater than the Optimal Usage Size, 18% greater than the Optimal Usage Size, 15% greater than the Optimal Usage Size).

"Balancing Threshold" refers to a threshold value that can be utilized to terminate rebalancing operations. In an example, the Balancing Threshold can be user-configured or user-provided. Various example Balancing Thresholds that can be utilized to terminate rebalancing operations include movement of files corresponding to 10% of the local container file capacity, Current Usage Size is less than 10% over the Optimal Usage Size, Current Usage Size has improved by 10%. In other examples, different percentages and/or different parameters can be utilized.

FIG. 1 illustrates one embodiment of block diagram of a plurality of nodes interconnected as a cluster. The cluster of nodes illustrated in FIG. 1 can be configured to provide storage services relating to the organization of information on storage devices. Further, the cluster of nodes illustrated in FIG. 1 can be managed utilizing the rebalancing strategies (e.g., rebalancing engine(s), rebalancing scanner(s), non-disruptive move mechanism) described herein.

The nodes of FIG. 1 (e.g., node 104, node 106) include various functional components that cooperate to provide a distributed storage system architecture of cluster 100. To that end, each node is generally organized as a network element (e.g., network element 108 in node 104, network element 110 in node 106) and a disk element (e.g., disk element 112 in node 104, disk element 114 in node 106). The network elements provide functionality that enables the nodes to connect to client(s) 102 over one or more network connections (e.g., 118, 120), while each disk element connects to one or more storage devices (e.g., disk 134, disk array 146).

In the example of FIG. 1, disk element 112 connects to disk 134 and disk element 114 connection to 146 (which includes disk 144 and 148). Node 104 and node 106 are interconnected by cluster switching fabric 116 which, in an example, may be a Gigabit Ethernet switch. It should be noted that while there is shown an equal number of network and disk elements in cluster 100, there may be differing numbers of network and/or disk elements. For example, there may be a plurality of network elements and/or disk elements interconnected in a cluster configuration that does not reflect a one-to-one correspondence between the network and disk elements. As such, the description of a node comprising one network elements and one disk element should be taken as illustrative only.

Client(s) 102 may be general-purpose computers configured to interact with node 104 and node 106 in accordance with a client/server model of information delivery. That is, each client may request the services of a node, and the corresponding node may return the results of the services requested by the client by exchanging packets over one or more network connections (e.g., 118, 120).

Client(s) 102 may issue packets including file-based access protocols, such as the Common Internet File System (CIFS) protocol or Network File System (NFS) protocol, over the Transmission Control Protocol/Internet Protocol (TCP/IP) when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

Disk elements (e.g., disk element 112, disk element 114) are illustratively connected to disks that may be individual disks (e.g., disk 134) or organized into disk arrays (e.g., disk array 146). Alternatively, storage devices other than disks may be utilized, e.g., flash memory, optical storage, solid state devices, etc. As such, the description of disks should be taken as exemplary only. As described below, in reference to FIG. 4, a file system may implement a plurality of flexible volumes on the disks. Flexible volumes may comprise a plurality of directories (e.g., directory 124, directory 136) and a plurality of subdirectories (e.g., sub 128, sub 140, sub 150, sub 152, sub 154). Junctions (e.g., junction 126, junction 130, junction 138) may be located in directories and/or subdirectories. It should be noted that the distribution of directories, subdirectories and junctions shown in FIG. 1 is for illustrative purposes. As such, the description of the directory structure relating to subdirectories and/or junctions should be taken as exemplary only.

Figure 2:
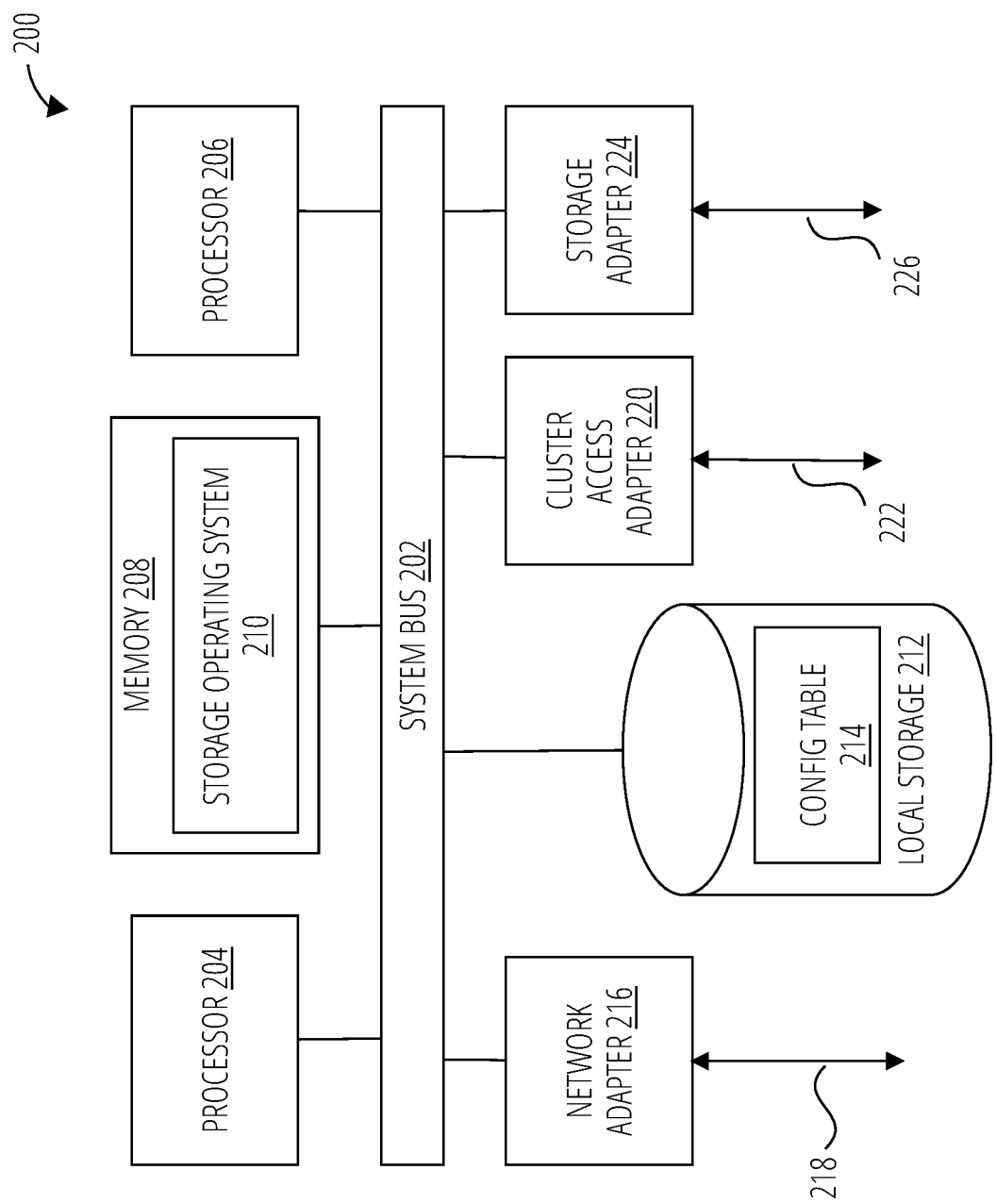
FIG. 2 illustrates one embodiment of a block diagram of a node.

FIG. 2 illustrates one embodiment of a block diagram of a node. Node 200 can be, for example, node 104 or node 106 as discussed in FIG. 1. The nodes illustrated in FIG. 2 can be managed utilizing the rebalancing strategies (e.g., rebalancing engine(s), rebalancing scanner(s), non-disruptive move mechanism) described herein.

In the example of FIG. 2, node 200 includes processor 204 and processor 206, memory 208, network adapter 216, cluster access adapter 220, storage adapter 224 and local storage 212 interconnected by 202. In an example, local storage 212 can be one or more storage devices, such as disks, utilized by the node to locally store configuration information (e.g., in config table 214).

Cluster access adapter 220 provides a plurality of ports adapted to couple node 200 to other nodes (not illustrated in FIG. 2) of a cluster. In an example, Ethernet is used as the clustering protocol and interconnect media, although it will be apparent to those skilled in the art that other types of protocols and interconnects may be utilized within the cluster architecture described herein. Alternatively, where the network elements and disk elements are implemented on separate storage systems or computers, cluster access adapter 220 is utilized by the network element (e.g., network element 108, network element 110) and disk element (e.g., disk element 112, disk element 114) for communicating with other network elements and disk elements in the cluster.

In the example of FIG. 2, node 200 is illustratively embodied as a dual processor storage system executing storage operating system 210 that can implement a high-level module, such as a file system, to logically organize the information as a hierarchical structure of named directories, files and special types of files called virtual disks (hereinafter generally "blocks") on the disks. However, it will be apparent to those of ordinary skill in the art that node 200 may alternatively comprise a single or more than two processor system. In an example, processor 204 executes the functions of the network element on the node, while processor 206 executes the functions of the disk element.

In an example, memory 208 illustratively comprises storage locations that are addressable by the processors and adapters for storing software program code and data structures associated with the subject matter of the disclosure. The processor and adapters may, in turn, comprise processing elements and/or logic circuitry configured to execute the software code and manipulate the data structures. Storage operating system 210, portions of which is typically resident in memory and executed by the processing elements, functionally organizes node 200 by, inter alia, invoking storage operations in support of the storage service implemented by the node. It will be apparent to those skilled in the art that other processing and memory means, including various computer readable media, may be used for storing and executing program instructions pertaining to the disclosure described herein.

Illustratively, storage operating system 210 can be the Data ONTAP® operating system available from NetApp™, Inc., Sunnyvale, Calif. that implements a Write Anywhere File Layout (WAFL®) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this disclosure. In an example, the ONTAP operating system can provide (or control the functionality of) the rebalancing engine and/or the rebalancing scanner as described herein.

In an example, network adapter 216 provides a plurality of ports adapted to couple node 200 to one or more clients (e.g., client(s) 102) over one or more connections 218, which can be point-to-point links, wide area networks, virtual private networks implemented over a public network (Internet) or a shared local area network. Network adapter 216 thus may include the mechanical, electrical and signaling circuitry needed to connect the node to the network. Illustratively, the computer network may be embodied as an Ethernet network or a Fibre Channel (FC) network. Each client may communicate with the node over network connections by exchanging discrete frames or packets of data according to pre-defined protocols, such as TCP/IP.

In an example, to facilitate access to disks, storage operating system 210 implements a write-anywhere file system that cooperates with one or more virtualization modules to "virtualize" the storage space provided by the disks. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization module(s) allow the file system to further logically organize information as a hierarchical structure of blocks on the disks that are exported as named logical unit numbers (LUNs).

In an example, storage of information on each array is implemented as one or more storage "volumes" that comprise a collection of physical storage disks cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

Storage adapter 224 cooperates with storage operating system 210 to access information requested by the clients. The information may be stored on any type of attached array of writable storage device media such as video tape, optical, DVD, magnetic tape, bubble memory, electronic random-access memory, micro-electromechanical and any other similar media adapted to store information, including data and parity information. However, as illustratively described herein, the information is stored on disks or an array of disks utilizing one or more connections 222. Storage adapter 224 provides a plurality of ports having input/output (I/O) interface circuitry that couples to the disks over an I/O interconnect arrangement, such as a conventional high-performance, CF link topology.

Figure 3:
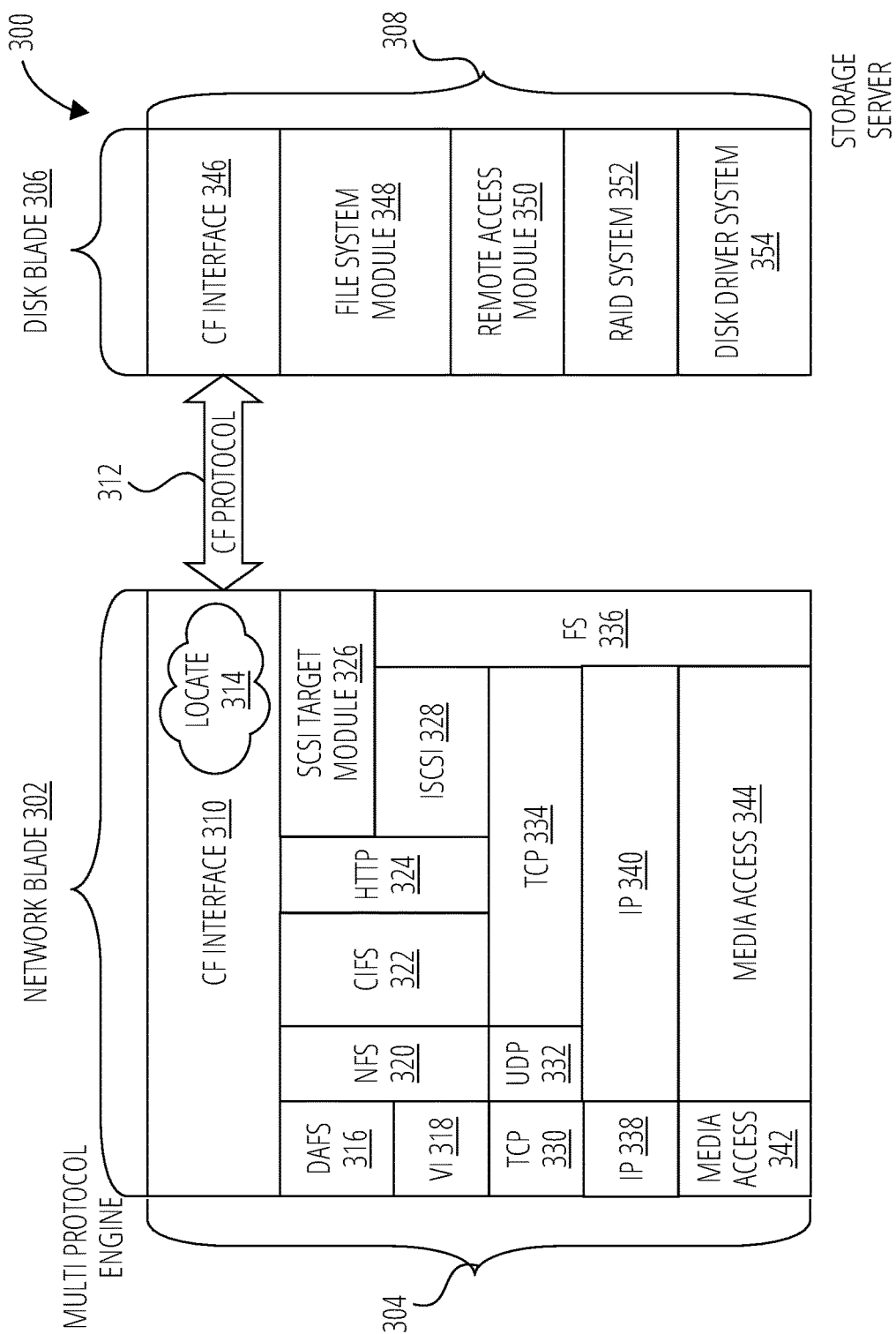
FIG. 3 illustrates one embodiment of a block diagram of a storage operating system.

FIG. 3 is a schematic block diagram of a storage operating system that may be advantageously used with the subject matter. Storage operating system 300 includes a series of software layers organized to form an integrated network protocol stack or, more generally, multi-protocol engine 304 that provides data paths for clients to access information stored on a node using block and file access protocols. In an example, multi-protocol engine 304 includes a media access layer (e.g., media access 342, media access 344) of network drivers (e.g., gigabit Ethernet drivers) that interfaces to network protocol layers, such as the Internet Protocol (IP) layer (e.g., IP 338, IP 340) and the corresponding supporting transport mechanisms, the Transport Control Protocol (TCP) layer (e.g., TCP 330, TCP 334) and the User Datagram Protocol (UDP) layer (e.g., UDP 332).

An example file system (FS) protocol layer (e.g., FS 336) provides multi-protocol file access and, to that end, includes support for Direct Access File System (DAFS) protocol (e.g., DAFS 316), Network File System (NFS) protocol (e.g., NFS 320), Common Internet File System (CIFS) protocol (e.g., CIFS 322) and the Hypertext Transfer Protocol (HTTP) (e.g., HTTP 324). Virtual Interface (VI) layer (e.g., VI 318) implements an architecture to provide direct access transport (DAT) capabilities, such as Remote Direct Memory Access (RDMA), to support Direct Access File System (DAFS) protocol (e.g., DAFS 316).

An Internet Small Computer Systems Interface (iSCSI) driver layer (e.g., iSCSI 328) provides block protocol access over TCP/IP network protocol layers, while a Cluster Fabric (CF) driver layer (e.g., CF interface 310) receives and transmits block access requests and responses to and from the node. In an example, the CF and iSCSI drivers provide CF-specific and iSCSI-specific access control to the blocks and, thus, manage exports of LUNs to either iSCSI or FCP or, alternatively, to both iSCSI and FCP when accessing the blocks on the node.

In addition, storage operating system 300 includes a series of software layers organized to form storage server 308 that provides data paths for accessing information stored on disks of a node. To that end, storage server 308 includes file system module 348 in cooperating relation with remote access module 350, RAID system 352 and disk driver system 354. RAID system 352 manages the storage and retrieval of information to and from the volumes/disks in accordance with I/O operations, while disk driver system 354 implements a disk access protocol such as, e.g., the SCSI protocol.

File system module 348 implements a virtualization system of storage operating system 300 through the interaction with one or more virtualization modules illustratively embodied as, e.g., a virtual disk (vdisk) module (not shown) and SCSI target module 326. SCSI target module 326 is generally disposed between the FC and iSCSI 328, file system 336 and file system 348 to provide a translation layer of the virtualization system between the block (LUN) space and the file system space, where LUNs are represented as blocks.

File system module 348 is illustratively a message-based system that provides logical volume management capabilities for use in access to the information stored on the storage devices, such as disks. That is, in addition to providing file system semantics, file system module 348 provides functions normally associated with a volume manager. These functions include (i) aggregation of the disks, (ii) aggregation of storage bandwidth of the disks, and (iii) reliability guarantees, such as mirroring and/or parity (RAID).

File system module 348 illustratively implements an exemplary a file system having an on-disk format representation that is block-based using, e.g., 4 kilobyte (kB) blocks and using index nodes ("inodes") to identify files and file attributes (such as creation time, access permissions, size and block location). File system module 348 uses files to store meta-data describing the layout of its file system; these meta-data files include, among others, an inode file. A file handle, i.e., an identifier that includes an inode number, is used to retrieve an in ode from disk. As described in greater detail below, a rebalancing scanner can operation in storage operating system 300 that supports inodes to scan and evaluate files in order to find one or more candidate files to move to a remote container.

Broadly stated, all inodes of the write-anywhere file system are organized into the inode file. A file system (FS) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from a client is forwarded as a packet over a computer network and onto a node where it is received via a network adapter. A network driver processes the packet and, if appropriate, passes it on to a network protocol and file access layer for additional processing prior to forwarding to the write-anywhere file system. Here, the file system generates operations to load (retrieve) the requested data from disk if it is not resident "in core", i.e., in memory. If the information is not in memory, the file system indexes into the inode file using the inode number to access an appropriate entry and retrieve a logical vbn. The file system then passes a message structure including the logical vbn to, for example, RAID system 352; the logical vbn is mapped to a disk identifier and disk block number (disk,dbn) and sent to an appropriate driver (e.g., SCSI) of the disk driver system. The disk driver accesses the dbn from the specified disk and loads the requested data block(s) in memory for processing by the node. Upon completion of the request, the node (and operating system) returns a reply to the client over the network.

Remote access module 350 is operatively interfaced between file system module 348 and RAID system 352. Remote access module 350 is illustratively configured as part of the file system to implement the functionality to determine whether a newly created data container, such as a subdirectory, should be stored locally or remotely. Alternatively, remote access module 350 may be separate from the file system. As such, the description of remote access module 350 being part of the file system should be taken as exemplary only. Further, remote access module 350 determines which remote flexible volume should store a new subdirectory if a determination is made that the subdirectory is to be stored remotely. More generally, remote access module 350 implements the heuristics algorithms used for the adaptive data placement. However, it should be noted that the use of a remote access module should be taken as illustrative. In alternative aspects, the functionality may be integrated into the file system or other module of the storage operating system. As such, the description of remote access module 350 performing certain functions should be taken as exemplary only.

It should be noted that while the subject matter is described in terms of locating new subdirectories, the principles of the disclosure may be applied at other levels of granularity, e.g., files, blocks, etc. As such, the description contained herein relating to subdirectories should be taken as exemplary only.

It should be noted that the software "path" through the storage operating system layers described above needed to perform data storage access for the client request received at the node may alternatively be implemented in hardware. That is, a storage access request data path may be implemented as logic circuitry embodied within a field programmable gate array (FPGA) or an application specific integrated circuit (ASIC). This type of hardware implementation increases the performance of the storage service provided by the node in response to a request issued by client 180. Alternatively, the processing elements of adapters (e.g., network adapter 216, storage adapter 224, cluster access adapter 220) may be configured to offload some or all of the packet processing and storage access operations, respectively, from the processor (e.g., processor 204, processor 206), to thereby increase the performance of the storage service provided by the node. It is expressly contemplated that the various processes, architectures and procedures described herein can be implemented in hardware, firmware or software.

As used herein, the term "storage operating system" generally refers to the computer-executable code operable on a computer to perform a storage function that manages data access and may, in the case of a node, implement data access semantics of a general-purpose operating system. The storage operating system can also be implemented as a microkernel, an application program operating over a general-purpose operating system, such as UNIX® or Windows NT®, or as a general-purpose operating system with configurable functionality, which is configured for storage applications as described herein.

In addition, it will be understood to those skilled in the art that aspects of the disclosure described herein may apply to any type of special-purpose (e.g., file server, filer or storage serving appliance) or general-purpose computer, including a standalone computer or portion thereof, embodied as or including a storage system. Moreover, the teachings contained herein can be adapted to a variety of storage system architectures including, but not limited to, a network-attached storage environment, a storage area network and disk assembly directly attached to a client or host computer. The term "storage system" should therefore be taken broadly to include such arrangements in addition to any subsystems configured to perform a storage function and associated with other equipment or systems. It should be noted that while this description is written in terms of a write anywhere file system, the teachings of the subject matter may be utilized with any suitable file system, including a write in place file system.

Illustratively, storage server 308 is embodied as disk blade 306 of storage operating system 300 to service one or more volumes of a disk array (e.g., disk array 146). In addition, multi-protocol engine 304 is embodied as network blade 302 to: (i) perform protocol termination with respect to a client issuing incoming data access request packets over a network, as well as (ii) redirect those data access requests to any storage server of the cluster. Moreover, network blade 302 and disk blade 306 cooperate to provide a highly scalable, distributed storage system architecture for a cluster (e.g., cluster 100). To that end, each module includes a cluster fabric (CF) interface module (e.g., CF interface 310, CF interface 346) adapted to implement intra-cluster communication among the modules (e.g., utilizing CF protocol 312), including disk element to disk element communication for data container striping operations, for example.

The protocol layers, e.g., the NFS/CIFS layers and the iSCSI/IFC layers, of network blade 302 function as protocol servers that translate file-based and block-based data access requests from clients into CF protocol messages used for communication with disk blade 306. That is, the network element servers convert the incoming data access requests into file system primitive operations (commands) that are embedded within CF messages by CF interface 310 for transmission to disk blade 306. Notably, CF interface 310 and CF interface 346 cooperate to provide a single file system image across all disk blades in a cluster. Thus, any network port of a network element that receives a client request can access any data container within the single file system image located on any disk element of the cluster.

Further, in an illustrative aspect of the disclosure, network blade 302 and disk blade 306 are implemented as separately scheduled processes of storage operating system 300; however, in an alternate aspect, the network blade 302 and disk blade 306 may be implemented as pieces of code within a single operating system process. Communication between a network element and disk element is thus illustratively affected through the use of message passing between the modules although, in the case of remote communication between a network element and disk element of different nodes, such message passing occurs over cluster switching fabric 116. A known message-passing mechanism provided by the storage operating system to transfer information between modules (processes) is the Inter Process Communication (IPC) mechanism. The protocol used with the IPC mechanism is illustratively a generic file and/or block-based "agnostic" CF protocol that comprises a collection of methods/functions constituting a CF application programming interface (API). Examples of such an agnostic protocol are the SpinFS and SpinNP protocols available from NetApp™, Inc.

CF interface 310 and CF interface 346 implement a CF protocol for communicating file system commands among the modules of the cluster. Communication is illustratively affected by the disk element exposing the CF API to which a network element (or another disk element) issues calls. To that end, the CF interface modules are organized as a CF encoder and CF decoder. The CF encoder encapsulates a CF message as (i) a local procedure call (LPC) when communicates a file system command to a disk element residing on the same node or (ii) a remote procedure call (RPC) when communicating the command to a disk element residing on a remote node of the cluster. In either case, the CF decoder de-encapsulates the CF message and processes the file system command.

Illustratively, the remote access module may utilize CF messages to communicate with remote nodes to collect information relating to remote flexible volumes. A CF message is used for RPC communication over the switching fabric between remote modules of the cluster; however, it should be understood that the term "CF message" may be used generally to refer to LPC and RPC communication between modules of the cluster. The CF message includes a media access layer, an IP layer, a UDP layer, a reliable connection (RC) layer and a CF protocol layer. The CF protocol is a generic file system protocol that conveys file system commands related to operations contained within client requests to access data containers stored on the cluster; the CF protocol layer is that portion of a message that carries the file system commands. Illustratively, the CF protocol is datagram based and, as such, involves transmission of messages or "envelopes" in a reliable manner from a source (e.g., network blade 302) to a destination (e.g., disk blade 306). The RC layer implements a reliable transport protocol that is adapted to process such envelopes in accordance with a connectionless protocol, such as UDP.

In one embodiment, a data container is represented in the write-anywhere file system as an inode data structure adapted for storage on the disks 130. In such an embodiment, an inode includes a meta-data section and a data section. The information stored in the meta-data section of each inode describes the data container (e.g., a file) and, as such, includes the type (e.g., regular, directory, vdisk) of file, its size, time stamps (e.g., access and/or modification time) and ownership (e.g., user identifier (UID) and group ID (GID), of the file, and a generation number. The contents of the data section of each inode may be interpreted differently depending upon the type of file (inode) defined within the type field. For example, the data section of a directory inode includes meta-data controlled by the file system, whereas the data section of a regular inode includes file system data. In this latter case, the data section includes a representation of the data associated with the file.

Specifically, the data section of a regular on-disk inode may include file system data or pointers, the latter referencing 4 KB data blocks on disk used to store the file system data. Each pointer is preferably a logical vbn to facilitate efficiency among the file system and the RAID system when accessing the data on disks. Given the restricted size (e.g., 128 bytes) of the inode, file system data having a size that is less than or equal to 64 bytes is represented, in its entirety, within the data section of that inode. However, if the length of the contents of the data container exceeds 64 bytes but less than or equal to 64 KB, then the data section of the inode (e.g., a first level inode) comprises up to 16 pointers, each of which references a 4 KB block of data on the disk.

Moreover, if the size of the data is greater than 64 KB but less than or equal to 64 megabytes (MB), then each pointer in the data section of the inode (e.g., a second level inode) references an indirect block (e.g., a first level L1 block) that contains 1024 pointers, each of which references a 4 KB data block on disk. For file system data having a size greater than 64 MB, each pointer in the data section of the inode (e.g., a third level L3 inode) references a double-indirect block (e.g., a second level L2 block) that contains 1024 pointers, each referencing an indirect (e.g., a first level L1) block. The indirect block, in turn, which contains 1024 pointers, each of which references a 4 kB data block on disk. When accessing a file, each block of the file may be loaded from disk into the memory.

When an on-disk inode (or block) is loaded from disk into memory, its corresponding in-core structure embeds the on-disk structure. For example, the dotted line surrounding the inode indicates the in-core representation of the on-disk inode structure. The in-core structure is a block of memory that stores the on-disk structure plus additional information needed to manage data in the memory (but not on disk). The additional information may include, e.g., a "dirty" bit. After data in the inode (or block) is updated/modified as instructed by, e.g., a write operation, the modified data is marked "dirty" using the dirty bit so that the inode (block) can be subsequently "flushed" (stored) to disk.

According to one embodiment, a file in a file system comprises a buffer tree ("buftree") that provides an internal representation of blocks for a file loaded into memory and maintained by the write-anywhere file system. A root (top-level) inode, such as an embedded inode, references indirect (e.g., level 1) blocks. In other embodiments, there may be additional levels of indirect blocks (e.g., level 2, level 3) depending upon the size of the file. The indirect blocks (e.g., and inode) includes pointers that ultimately reference data blocks used to store the actual data of the file. That is, the data of file are contained in data blocks and the locations of these blocks are stored in the indirect blocks of the file. Each level 1 indirect block may include pointers to as many as 1024 data blocks. According to the "write anywhere" nature of the file system, these blocks may be located anywhere on the disks.

Figure 4:
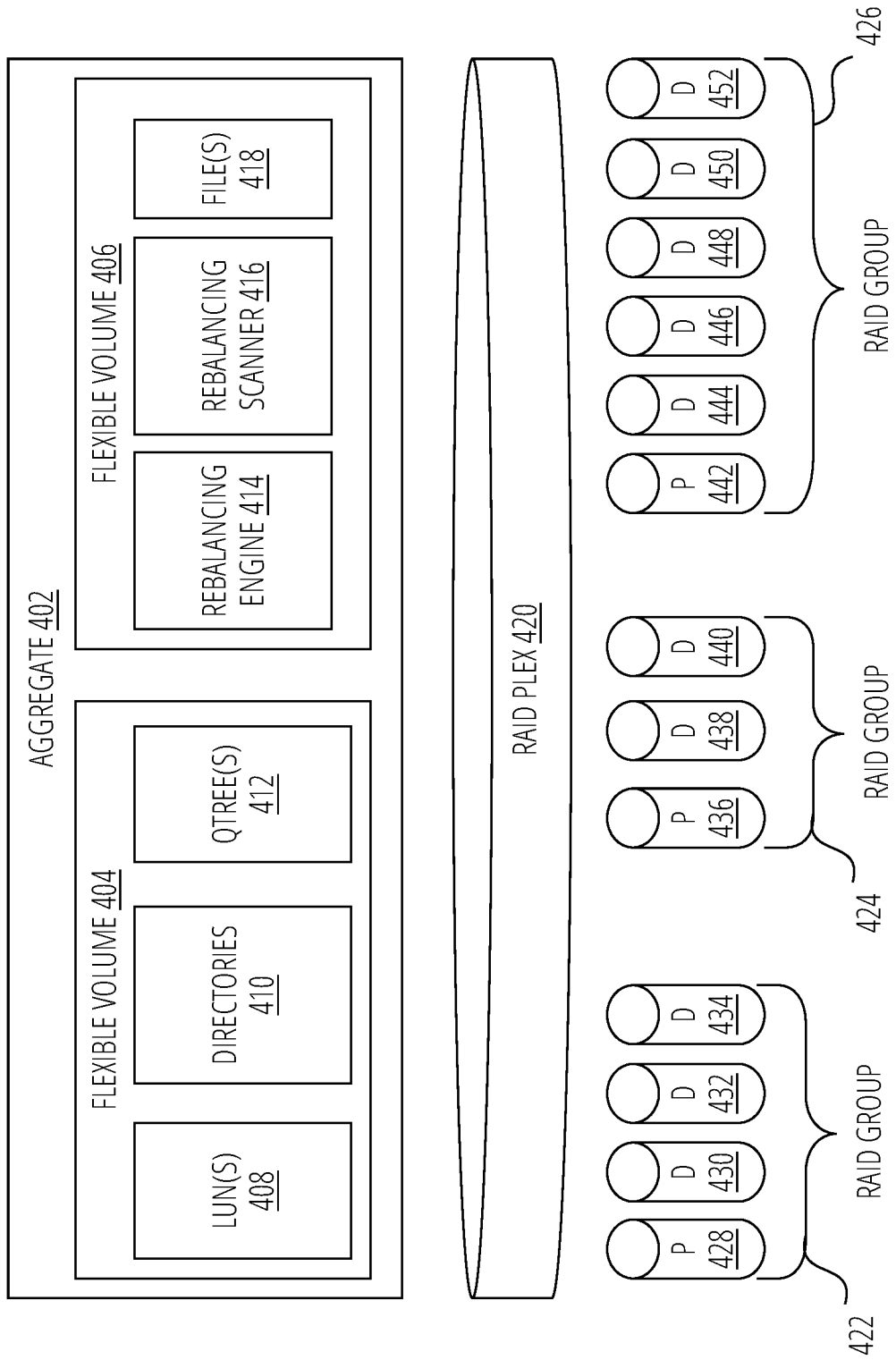
FIG. 4 illustrates one embodiment of a block diagram of an aggregate.

FIG. 4 illustrates one embodiment of a block diagram of an aggregate. In one embodiment, a file system layout is provided that apportions an underlying physical volume into one or more virtual volumes (or flexible volume) of a storage system. In an example each flexible volume (e.g., flexible volume 404, flexible volume 406) can include a rebalancing engine (e.g., rebalancing engine 414) and a rebalancing scanner (e.g., rebalancing scanner 416) that operate to rebalance files as using the approaches described herein.

In such an embodiment, the underlying physical volume is an aggregate comprising one or more groups of disks, such as RAID groups, of the node. In an example, aggregate 402 has its own physical volume block number (pvbn) space and maintains meta-data, such as block allocation structures, within that pvbn space. Each flexible volume (e.g., flexible volume 404, flexible volume 406) has its own virtual volume block number (vvbn) space and maintains meta-data, such as block allocation structures, within that vvbn space. Each flexible volume is a file system that is associated with a container file; the container file is a file in aggregate 402 that contains all blocks used by the flexible volume. Moreover, each flexible volume comprises data blocks and indirect blocks that contain block pointers that point at either other indirect blocks or data blocks.

LUN(s) 408, directories 410, Qtree(s) 412 and file(s) 418 may be included within flexible volume 404 and/or flexible volume 406, such as dual vbn flexible volumes, that, in turn, are contained within aggregate 402. In one embodiment, flexible volume 404 and/or flexible volume 406 including elements within the flexible volumes may comprise junctions to provide redirection information to other flexible volumes, which may be contained within aggregate 402, may be stored in aggregate service by other key modules in the distributed file system. Assets, the description of elements being stored within a flexible volume should be taken as exemplary only. Aggregate 402 is illustratively layered on top of the RAID system, which is represented by at least one RAID plex 420 (depending upon whether the storage configuration is mirrored), wherein each RAID plex 420 includes at least one RAID group (e.g., RAID group 422, RAID group 424, RAID group 426). Each RAID group further comprises a plurality of disks, one or more data (D) disks (e.g., 430, 432, 434, 438, 440, 444, 446, 448, 450, 452) and at least one (P) parity disk (e.g., 428, 436, 442).

Whereas aggregate 402 is analogous to a physical volume of a conventional storage system, a flexible volume (e.g., flexible volume 404, flexible volume 406) is analogous to a file within that physical volume. That is, aggregate 402 may include one or more files, wherein each file contains a flexible volume and wherein the sum of the storage space consumed by the flexible volumes is physically smaller than (or equal to) the size of the overall physical volume. The aggregate utilizes a physical pvbn space that defines a storage space of blocks provided by the disks of the physical volume, while each embedded flexible volume (within a file) utilizes a logical vvbn space to organize those blocks, e.g., as files. Each vvbn space is an independent set of numbers that corresponds to locations within the file, which locations are then translated to dbns on disks. Since the flexible volume is also a logical volume, it has its own block allocation structures (e.g., active, space and summary maps) in its vvbn space.

In a further embodiment, pvbns are used as block pointers within buffer trees of files stored in a flexible volume. This "hybrid" flexible volume example involves the insertion of only the pvbn in the parent indirect block (e.g., inode or indirect block). On a read path of a logical volume, a "logical" volume (vol) info block has one or more pointers that reference one or more fsinfo blocks, each of which, in turn, points to an inode file and its corresponding inode buffer tree. The read path on a flexible volume is generally the same, following pvbns (instead of vvbns) to find appropriate locations of blocks; in this context, the read path (and corresponding read performance) of a flexible volume is substantially similar to that of a physical volume. Translation from pvbn-to-disk,dbn occurs at the file system/RAID system boundary of the storage operating system.

In a dual vbn hybrid flexible volume example, both a pvbn and its corresponding vvbn are inserted in the parent indirect blocks in the buffer tree of a file. That is, the pvbn and vvbn are stored as a pair for each block pointer in most buffer tree structures that have pointers to other blocks, e.g., level 1 (L1) indirect blocks, inode file level 0 (L0) blocks.

A root (top-level) inode, such as an embedded inode, references indirect (e.g., level 1) blocks. Note that there may be additional levels of indirect blocks (e.g., level 2, level 3) depending upon the size of the file. The indirect blocks (and inode) include pvbn/vvbn pointer pair structures that ultimately reference data blocks used to store the actual data of the file. The pvbns reference locations on disks of the aggregate, whereas the vvbns reference locations within files of the flexible volume. The use of pvbns as block pointers in the indirect blocks provides efficiencies in the read paths, while the use of vvbn block pointers provides efficient access to required meta-data. That is, when freeing a block of a file, the parent indirect block in the file contains readily available vvbn block pointers, which avoids the latency associated with accessing an owner map to perform pvbn-to-vvbn translations; yet, on the read path, the pvbn is available.

A container file is a file in the aggregate that includes all blocks used by a flexible volume. The container file is an internal (to the aggregate) feature that supports a flexible volume; illustratively, there is one container file per flexible volume. Similar to a pure logical volume in a file approach, the container file is a hidden file (not accessible to a user) in the aggregate that holds every block in use by the flexible volume. In an example, the aggregate includes a hidden meta-data root directory that contains subdirectories of flexible volumes.

In an example, a physical file system directory includes a subdirectory for each flexible volume in the aggregate, with the name of subdirectory being a file system identifier (fsid) of the flexible volume. Each fsid subdirectory (flexible volume) contains at least two files, a file system file and a storage label file. The storage label file is illustratively a 4 kB file that contains meta-data similar to that stored in a conventional RAID label. In other words, the storage label file is the analog of a RAID label and, as such, contains information about the state of the flexible volume such as, e.g., the name of the flexible volume, a universal unique identifier (uuid) and fsid of the flexible volume, whether it is online, being created or being destroyed, etc.

As discussed above, aggregate 402 is analogous to a physical volume of a conventional storage system. In a conventional data storage environment utilizing physical volumes and/or virtual volumes, the innovative rebalancing techniques can be utilized by the operating system being utilized to provide a more efficient operating environment.

As one specific and non-limiting example, when utilizing the ONTAP® operating system, aggregate 402 can be configured as a FlexGroup as supported by the ONTAP® operating system. However, it is expressly contemplated that any appropriate alternative storage operating system may be enhanced for use in accordance with the innovative principles described herein. Returning to the FlexGroup example, a constituent volume refers to the underlying flexible volume (e.g., flexible volume 404, flexible volume 406) that provide the storage functionality of the FlexGroup. A FlexGroup is a single namespace that can be made up of multiple constituent volumes ("constituents"). In an example, each FlexGroup contains an entity (e.g., "Flex-Group State") that has an object corresponding to each constituent of the FlexGroup and collects information for each constituent. The FlexGroup State can also exchange constituent information with other peer FlexGroups.

One or more components of the ONTAP operating system can monitor aggregate 402 to determine a total usage of the available storage space. In an example, total usage can be divided by a total number of constituents (or containers) to determine an ideal usage level/parameter. As described in greater detail below (e.g., with respect to FIG. 6 and FIG. 7), rebalancing engines within the containers/constituents (e.g., within an overall FlexGroup container) can analyze the individual containers to determine how many containers and/or which containers exceed an ideal usage by a preconfigured amount.

For example, a rebalancing engine (e.g., rebalancing engine 414) in a container/constituent can analyze usage parameters associated with the container/constituent and determine that usage exceeds an ideal level (e.g., 65%, 75%, 83%) by a preselected amount (e.g., 20%, 25%, 15%). That is, the rebalancing engine can determine that the Current Usage Size for a container exceeds the Maximum Usage Size.

In response to this determination, the rebalancing engine can take one or more actions including: 1) triggering a rebalancing scanner (e.g., rebalancing scanner 416) to perform scanning and/or analysis operations to identify one or more files (e.g., within file(s) 418) to be moved out of the local container; 2) communicate with rebalancing engines in other containers (e.g., other containers within the same flexible volume, other containers within the aggregate) to find a destination container for one or more files (e.g., such that the move(s) do not cause the destination container to exceed its ideal level, the moves provide sufficient benefit to the local container that the one or more files are moved from); and/or 3) analyze a database indicating candidate files for movement (e.g., that can be determined and provided to the database by the local rebalancing scanner). Various examples of rebalancing scanner functionality are provided in FIG. 9, FIG. 11A, FIG. 11B and FIG. 11C.

In an example, in response to finding at least one potential destination, the rebalancing engine can trigger the rebalancing scanner of the same container to scan the files stored on the container for candidates to move to the potential destination(s). In an example, files that are candidates for movement to a new container can be stored in a table or database accessible by the rebalancing engine. In an example, if the scanner finds candidate files, the rebalancing engine can cause a non-disruptive move mechanism to move the candidate files from the local container to the destination container(s).

Figure 5:
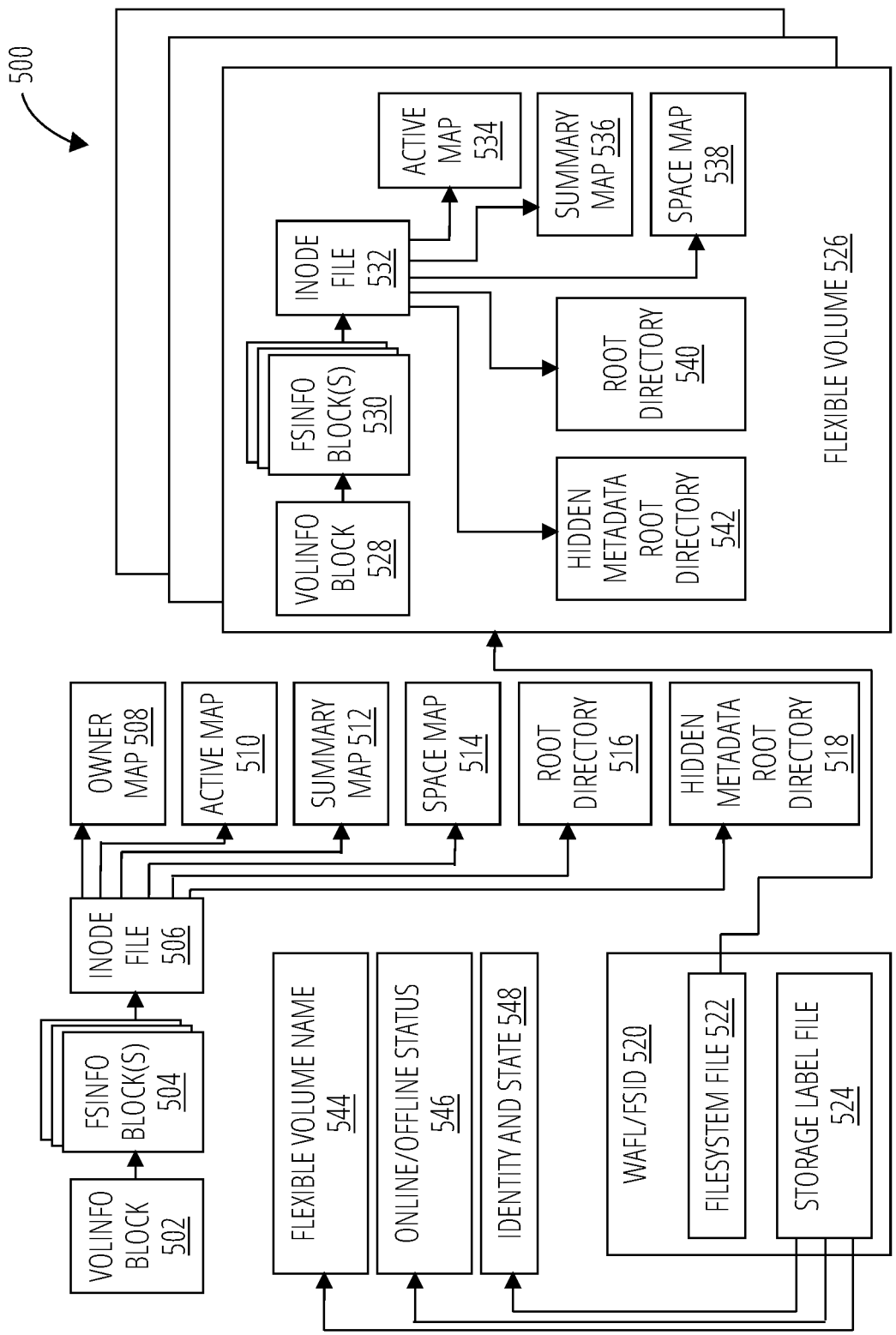
FIG. 5 illustrates one embodiment of a block diagram of an on-disk layout of the aggregate.

FIG. 5 illustrates one embodiment of a block diagram of an on-disk layout of an aggregate. Some of the elements illustrated in FIG. 5 can be utilized by a rebalancing scanner to evaluate files for potential movement to a remote container including, for example, filesystem file 522, hidden metadata root directory 542, etc.

The storage operating system (e.g., storage operating system 210) utilizes the RAID system (e.g., RAID system 352), to assemble a physical volume of pvbns to create an aggregate (e.g., aggregate 402), with pvbns 1 and 2 comprising a "physical" volinfo block 502 for the aggregate. In an example, volinfo block 502 contains block pointers to fsinfo block(s) 504, each of which may represent a snapshot of the aggregate. Each fsinfo block(s) 504 includes a block pointer to an inode file 506 that contains inodes of a plurality of files, including owner map 508, active map 510, summary map 512 and space map 514, as well as other special meta-data files. Inode file 506 further includes root directory 516 and hidden metadata root directory 518, the latter of which includes a namespace having files related to a flexible volume in which users cannot "see" the files. In an example, hidden metadata root directory 518 includes the WAFL/fsid/ directory structure (WAFL/fsid 520) that contains filesystem file 522 and storage label file 524. In an example, root directory 516 in the aggregate is empty; files related to the aggregate are organized within hidden metadata root directory 518.

In addition to being embodied as a container file having level 1 blocks organized as a container map, filesystem file 522 includes block pointers that reference various file systems embodied as one or more flexible volume 526. The aggregate maintains these flexible volumes at special reserved inode numbers. In an example, each flexible volume 526 also has reserved inode numbers within its flexible volume space that are used for, among other things, the block allocation bitmap structures. As noted, the block allocation bitmap structures, e.g., active map 534, summary map 536 and space map 538, are located in each flexible volume.

Specifically, each flexible volume 526 has the same inode file structure/content as the aggregate, with the exception that there is no owner map and no WAFL/fsid/file system file, storage label file directory structure in hidden metadata root directory 542. To that end, each flexible volume 526 has volinfo block 528 that points to one or more fsinfo block(s) 530, each of which may represent a snapshot, along with the active file system of the flexible volume. Each fsinfo block, in turn, points to an inode file 532 that, as noted, has the same inode structure/content as the aggregate with the exceptions noted above. Each flexible volume 526 has its own inode file 532 and distinct inode space with corresponding inode numbers, as well as its own root directory 540 and subdirectories of files that can be exported separately from other flexible volumes.

Storage label file 524 contained within hidden metadata root directory 518 of the aggregate is a small file that functions as an analog to a conventional RAID label. A RAID label includes physical information about the storage system, such as the volume name; that information is loaded into storage label file 524. Illustratively, storage label file 524 includes the flexible volume name 544 of the associated flexible volume 526, online/offline status 546 of the flexible volume, and identity and state 548 of the associated flexible volume (whether it is in the process of being created or destroyed).

Figure 6:
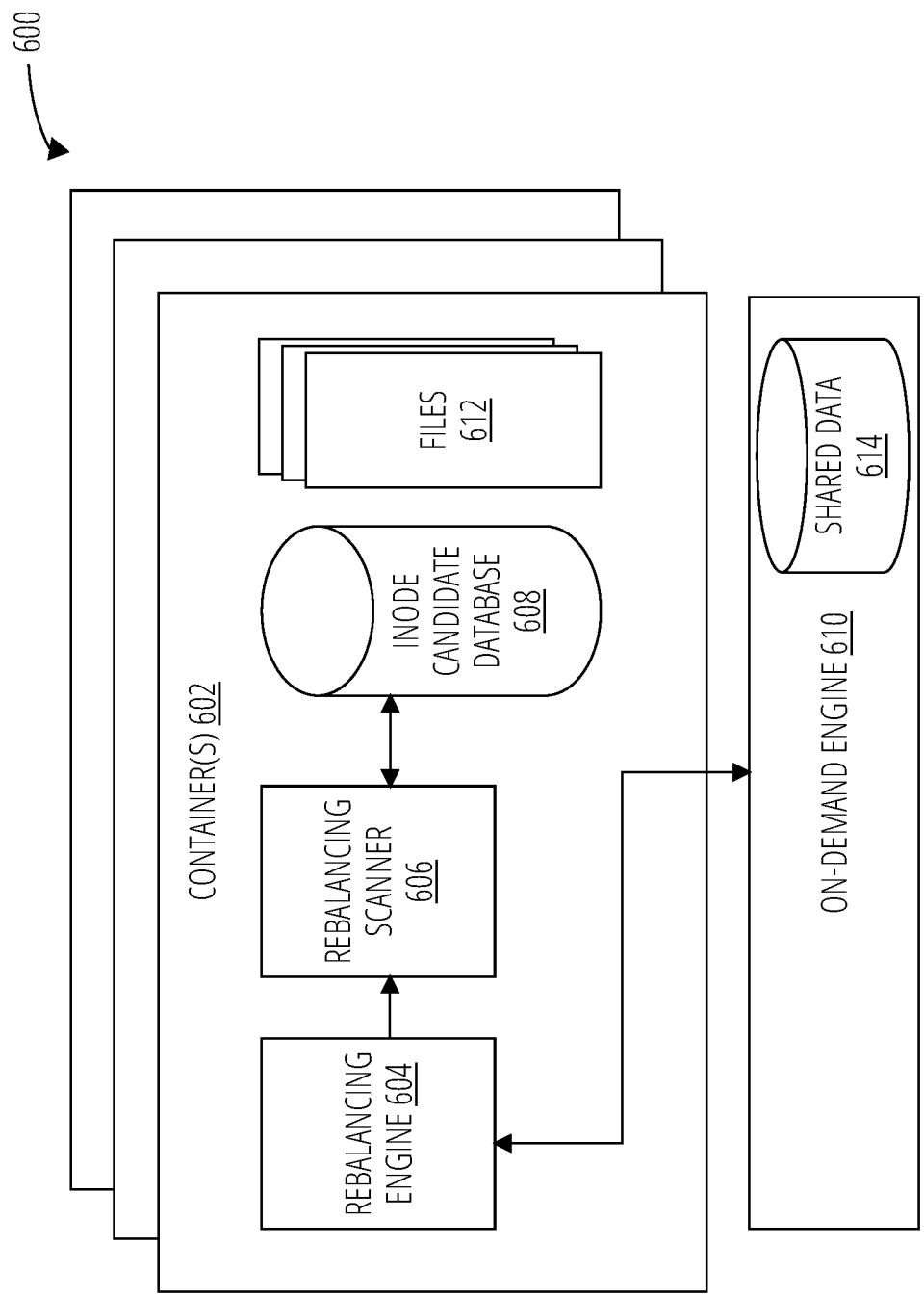
FIG. 6 illustrates one embodiment of a block diagram of a redistribution system.

FIG. 6 illustrates one embodiment of a block diagram of a redistribution system 600 implemented to rebalance the distributed file system. As mentioned above, file distribution within the distributed file system may become imbalanced over time. As shown in FIG. 6, distributed file system 600 includes one or more container(s) 602 and on-demand engine 610. In one embodiment, each rebalancer comprises rebalancing engine 604, rebalancing scanner 606 and inode candidate database 608.

In a further embodiment, each rebalancing engine 604 is associated with a flexible volume (or container) within distributed file system 600 and implemented to analyze the current state of the distributed file system in order to facilitate file movement for its respective container. In such an embodiment, each rebalancing engine 604 continuously monitors the state of distributed file system 600 to determine whether one or more files are to be moved from one container to another. Rebalancing engine 604 performs state monitoring by periodically monitoring (e.g., once per second) a constantly refreshed set of data shared by all containers, which reflects the overall state of distributed file system 600 (e.g., shared data 614, which is part of, or accessible via, on-demand engine 610). In an example, rebalancing engine 604 monitors one or more of the Optimal Usage Size for the container, the Current Usage Size for the container and/or the Maximum Usage Size for the container.

In one embodiment, on-demand engine 610 is "aware" of the amount of data in-transfer to and from a constituent and can be stored as part of shared data 614. In an example, shared data 614 with respect to on-demand engine 610 can be used to prevent moving too much data to a particular constituent by tracking how much data and which files are currently in flight. In an example, on-demand engine 610 can use one or more of the Optimal Usage Size for the container, the Current Usage Size for the container and/or the Maximum Usage Size to determine, for example, if too much data is transferring between constituents.

In one embodiment, each rebalancing engine 604 determines whether its associated container comprises an optimal distribution of files, which can be determined as within a preselected percentage of an ideal distribution of files. An optimal distribution of files within the distributed file system is implemented to ensure that files are stored in an approximately equivalent distribution between containers (or constituents). In a further embodiment, optimal distribution is implemented by applying a user configured storage capacity (or optimal usage size) for each container. In an example, rebalancing engine 604 compares the current size of a container to determine whether the current size exceeds the optimal usage size. In other embodiments, the optimal usage size may dynamically be calculated based on the current storage load within the distributed file system.

In a further embodiment, a second threshold (e.g., the Balancing Threshold) may be implemented to compare to the Maximum Usage Size (or other metric). In this embodiment, the Balancing Threshold can be a user configured threshold (e.g., 10%) at which the rebalancing process may be terminated. For example, once the rebalancing process begins the excess size value is compared to the balanced threshold, in which an excess size greater than the balanced threshold indicates that rebalancing is to continue (e.g., the current size of a container continues to violate the optimal usage size) and an excess size value less than the balanced threshold indicates that the rebalancing process is to be terminated.

Upon determining that files should be moved, rebalancing engine 604 finds a best container to which one or more files should be moved. In one embodiment, engine analyzes the other constituents to find the one with the smallest size (other selection strategies can also be utilized). Rebalancing engine 604 also performs a query of inode candidate database 608 via rebalancing scanner 606 to determine whether there are one or more files that are candidates to be moved (or candidate file). Rebalancing scanner 606 initiates a scan of inode candidate database 608 based on the success of the query, or if sufficient time has passed since the previous scan has occurred. In one embodiment, both actions are triggered at the time of rebalancing engine 604 issuing the query.

Additionally, rebalancing scanner 606 determines whether inode candidate database 608 includes candidate files. In one embodiment, a candidate file comprises a file that, when moved, reduces the current size of the container towards the optimal usage size (or below). Additional scanning and selection parameters are described in greater detail below. In some instances, a singular file may reduce the container to the optimal usage. However, in most instances, rebalancing scanner 606 finds a plurality of candidate files that may be moved until the balanced state is reached. Thus, rebalancing scanner 606 returns files that, when moved, reduces the current size of the container as much as possible for a singular file, with a likelihood of additional files needing to be moved based on the reduced excess size value.

In one embodiment, rebalancing scanner 606 performs the scan by scanning inode files associated with the container. In a further embodiment, scanner scans an inode buftree for every inode that is found. In an example, the buftree scan is performed on level one (L1) indirects for the inode. In yet a further embodiment, rebalancing scanner 606 performs an inspection of the file metadata as well as the individual file blocks upon encountering files to determine whether the file is a candidate file. In such an embodiment, rebalancing scanner 606 examines each file against one or more criteria and parameters to determine whether the file may be a candidate to be added to the database. Criteria may include parameters such as File Type, Minimum File Size, Maximum File Size and Storage Efficiency. A File Type criterion indicates whether a file is a type of file that is acceptable to be moved. For example, there are various file types that cannot be moved to another container.

The Minimum File Size criterion (e.g., 20 MB, 100 MB) indicates that a file has a size substantially sufficient to efficiently reduce the current container size to the optimal usage size and/or provides an efficient utilization of the file transfer mechanism. The Maximum File Size criterion (e.g., 75 GB, 100 GB) indicates that a file is too large to move. The Storage Efficiency criterion indicates an ability to compress and/or de-duplicate the file (e.g., actions performed to preserve space) if the file is moved. For example, a file may not be considered a candidate if the file is not be able to preserve the same amount of space at the destination container. Thus, files are ignored if the file would lose storage efficiency. In other embodiments, additional criteria may be implemented that include metrics that determine whether moving a file would not result in a substantial enough improvement on the distributed file system. In an example, files that are part of a snapshot are not candidates to be moved.

Rebalancing scanner 606 adds candidate files to inode candidate database 608, which comprises an ordered, database that is queried by to find appropriate candidates to move to other containers. In one embodiment, rebalancing scanner 606 continues to perform the scan for a pre-determined time interval or until inode candidate database 608 has filled with a sufficient quantity of entries to satisfy the scan request received from rebalancing scanner 606.

In a further embodiment, inode candidate database 608 comprises an in-memory database, whose capacity may be bounded by the available memory on the machine or set to a predetermined size. In this embodiment, each inode candidate entry in the database includes information about the inode identity and the file size of the inode.

The inode candidate entries in the database may become invalid or stale as incoming fileops remove files or change the size of files. When the rebalancing scanner 606 needs to insert new entries into inode candidate database 608 and inode candidate database 608 has reached its capacity, the oldest entries in inode candidate database 608 are removed first to make space for the new entries. Inode candidate database 608 may also choose to first remove entries having the largest file size upon determining that inode candidate database 608 does not have a candidate whose file size is sufficiently small for rebalancing engine 604 to consume. In another example, existing entries can be updated with an updated file size, etc.

In an example, entries in inode candidate database 608 have an associated concept of reclaimable blocks. Conceptually, files removed from the local container and moved to the destination container reduce the storage capacity consumption in the local container and increase the storage capacity consumption in the remote container. However, for various reasons, the capacity reduced in the local container is not necessarily equivalent to the capacity consumed in the remote container.

For example, some or all of a file may be replicated and any deduplication resulting from moving the file may not reclaim the full file size in the local container. In an example, potential deduplication may be utilized as a factor in prioritizing files in inode candidate database 608. In an example, a buftree scan can be used to determine various lower-level file characteristics including, for example, deduplication, compression, etc.

In an example, selection of files to be moved for rebalancing purposes can treated as a two-dimensional selection process. In an example, the first dimension is a maximum file size that will fit in the selected destination container. For example, if the local rebalancing engine (e.g., rebalancing engine 604) communicates with one or more remote rebalancing engines (or other components capable of providing the desired information) and finds a remote container that can accept up to 200 MB of files from the local container, then the first dimension of the file selection is to find one or more local files that can be moved and can fit in 200 MG of disk space in the remote container. In an example, largest possible files that can fit in the available space are selected for movement. In another example, the largest number of files that exceed the minimum file size can be selected for movement. Alternatively, other file selection strategies to find one or more files to fit in the available space can be utilized.

In an example, the second dimension of the selection process is to attempt to maximize the reclaimed space in the local container. Using the lower-level information gathered, for example, the buftree scan, candidate files can be evaluated to estimate the amount of storage capacity that will be recaptured by moving the candidate files to the remote container. In an example, the lower-level information can be determined from analysis of file metadata and/or from the buftree scan.

Upon selecting candidate files rebalancing engine 604 calls on-demand engine 610 to move the files throughout the file system without system interruption. In one embodiment, on-demand engine 610 performs a virtual instantaneous file-move from a source to a destination (e.g., a source container to a destination container) even though such a move is not performed instantaneously. On-demand engine 610 makes the move appear instantaneous by framing a pre-defined cutover window and allowing client access to the destination while in the background slowly moving the data over. During this predefined cutover window, the client is unable to write the file. If the cutover time window is exceeded, it makes the file available in the destination constituent for read/write access. If a client accesses part of the data that has yet to be transferred to the destination, the segment of the data is copied "on demand" over to the destination in line with the fileop request.

Figure 7:
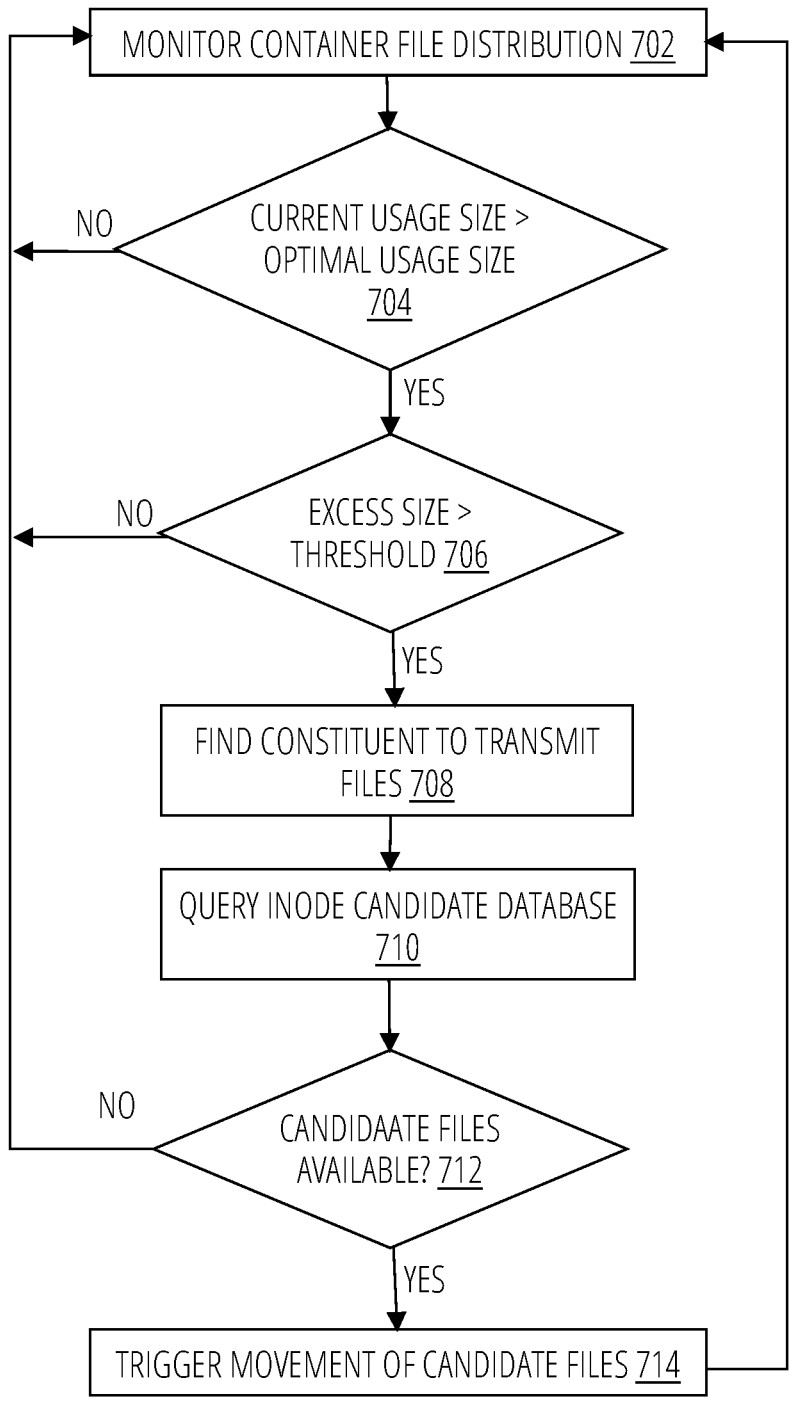
FIG. 7 is a flow diagram illustrating one embodiment of a process for performing file redistribution.

FIG. 7 is a flow diagram illustrating one embodiment of a process for performing file redistribution. One or more of the operations of FIG. 7 are performed by a rebalancing engine (e.g., rebalancing engine 414, rebalancing engine 604) and one or more of the operations of FIG. 7 are performed by a rebalancing scanner (e.g., rebalancing scanner 416, rebalancing scanner 606).

At block 702, container file distribution is monitored. As discussed above, this process is performed periodically (e.g., once per second). In an example, the container monitoring is performed by the rebalancing engine of the local container. The rebalancing engine can access file parameter and/or performance information that is stored locally within the container and/or file parameter and/or performance information that is stored externally, for example, in a host aggregate container or elsewhere.

At decision block 704, a determination is made as to whether the current container Current Usage Size is greater than the container Optimal Usage Size. If not, control is returned to block 702 where the container file distribution continues to be monitored.

If, at decision block 704, the current container Current Usage Size is greater than the container Optimal Usage Size, a determination is made as to whether the excess size (i.e., Current Usage Size minus Maximum Usage Size) is greater than the excess size threshold (i.e., Maximum Usage Size minus Optimal Usage Size), at decision block 706. If not, control is again returned to processing block 702 where the container file distribution continues to be monitored.

Upon a determination at decision block 706 that the excess size is greater than the size threshold a constituent is found to transfer one or more files, block 708. In an example, the destination constituent/container is determined by the rebalancing engine.

At block 710 the inode candidate database (e.g., inode candidate database 608 or ICDB) is queried to find candidate files to be transferred to the destination constituent determined in block 708. In an example, the inode candidate database is queried by the rebalancing engine. In an example, the inode candidate database is populated by the rebalancing scanner.

In an example, the rebalancing scanner is responsible for performing potentially a full file system scan on its local container to search for file candidates to move. In an example, this scanning operation occurs in response to a trigger or other indication from the rebalancing engine of the container. In an example, as the rebalancing scanner encounters files it performs a deep inspection of the file metadata was well as the individual file blocks to determine if the file is an acceptable candidate for movement.

Various conditions, metrics and/or parameters can be utilized to determine if a file is an acceptable candidate for movement. Possible reasons for not being an acceptable candidate includes, for example, certain file types, whether the file is part of a snapshot, states of the file and/or various metrics that determine that moving the file would not result in a substantial enough improvement of the distributed file system. If a file is determined to be an acceptable candidate, it can be added to an ordered, queryable database that the rebalancing engine can use to find appropriate candidates to move. The rebalancing scanner can be driven multiple times for various reasons as the search for acceptable file candidates continues.

At decision block 712, a determination is made as to whether candidate files are available in the ICDB database. If not, control is returned to block 702, where the container file distribution continues to be monitored. Upon a determination that candidate files are available at decision block 712, the movement of candidate files is triggered block 714. In an example, movement of the files is controlled by the rebalancing engine and processed by a non-disruptive file movement mechanism.

In an example, movement of the candidate files continues until the Balancing Threshold has been reached or passed. In other examples, other conditions/parameters can be utilized to terminate movement of candidate files, for example, a specified number of file movements (e.g., 100, 1,000), a specified amount of data (e.g., 50 GB, 80 GB), recapture of a specified amount of storage capacity (e.g., 25 GB, 50 GB), etc.

As discussed above, final selection of which candidate file to move can be based on a two-dimensional selection process that considers available space on the destination container and the amount of space that will be reclaimed on the local container where an estimation of the amount of space that can be reclaimed on the local container can come from an analysis of file metadata and/or information from a buftree scan.

Figure 8:
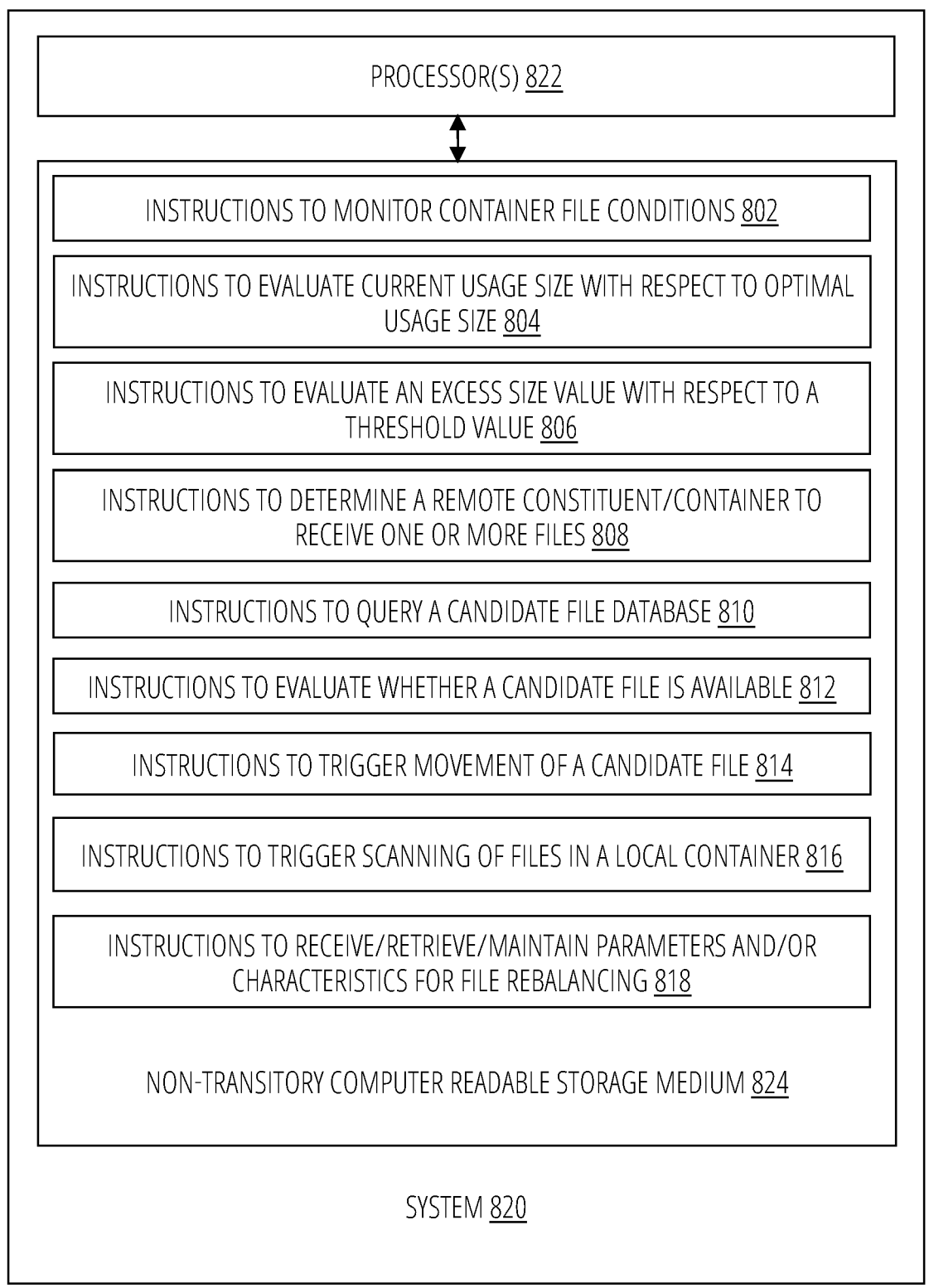
FIG. 8 is an example of a system to provide a process for performing file redistribution.

FIG. 8 is an example of a system to provide a process for performing file redistribution. In an example, system 820 can include processor(s) 822 and non-transitory computer readable storage medium 824. In an example, processor(s) 822 and non-transitory computer readable storage medium 824 can be part of a node (e.g., node 200) having a storage operating system (e.g., storage operating system 210) that can provide some or all of the functionality of the ONTAP software as mentioned above. In an example, system 820 can provide the functionality described herein with respect to the rebalancing engine (e.g., rebalancing engine 414, rebalancing engine 604).

Non-transitory computer readable storage medium 824 may store instructions 802, 804, 806, 808, 810, 812, 814, 816 and 818 that, when executed by processor(s) 822, cause processor(s) 822 to perform various functions. Examples of processor(s) 822 may include a microcontroller, a microcontroller, a microprocessor, a central processing unit (CPU), a graphics processing unit (GPU), a data processing unit (DPU), an application-specific integrated circuit (ASIC), a field programmable gate array (FPGA), a system on a chip (SoC), etc. Examples of non-transitory computer readable storage medium 824 include tangible media such as random-access memory (RAM), read-only memory (ROM), electrically erasable programmable read-only memory (EEPROM), flash memory, a hard disk drive, etc.

Instructions 802 cause processor(s) 822 to monitor file conditions within the local container. As discussed above, this process is performed periodically (e.g., once per second, every 5 seconds, once per minute). The period selected can change based on various conditions/parameters (e.g., time of day, processor workload, storage utilization levels). The rebalancing engine can access file parameter and/or performance information (e.g., Current Usage Size) that is stored locally within the container and/or file parameter and/or performance information that is stored externally, for example, in a host aggregate container or elsewhere.

Instructions 804 cause processor(s) 822 to evaluate the Current Usage Size with respect to the Optimal Usage size. If the Current Usage Size is less than the Optimal Usage Size, no changes are initiated with respect to file rebalancing and the file system parameters and/or performance information are monitored (e.g., Instructions 802).

Instructions 806 cause processor(s) 822 to, if the Current Usage Size is greater than the Optimal Usage Size, evaluate an excess value (e.g., Current Usage Size minus Optimal Usage Size) with respect to a threshold value (e.g., 20% greater than the Optimal Usage Size, 23% greater than the Optimal Usage Size, 33% greater than the Optimal Usage Size, 18% greater than the Optimal Usage Size, 15% greater than the Optimal Usage Size). If the excess value is less than the threshold value, no changes are initiated with respect to file rebalancing and the file system parameters and/or performance information are monitored (e.g., instructions 802).

Instructions 808 cause processor(s) 822 to determine a remote constituent/container to receive one or more files from the local container. In an example, the rebalancing engine of the local container communicates with rebalancing engines of one or more remote constituents/containers to determine if the remote entities are available to accept one or more files from the local container. In an example, the rebalancing engine can obtain availability information from other sources (e.g., shared data 614) in addition to (or instead of) directly from rebalancing engines of remote containers.

Instructions 810 cause processor(s) 822 to query the inode candidate database (e.g., inode candidate database 608) to find candidate files to be transferred to the destination constituent/container (e.g., as determined by instructions 808). In an example, the inode candidate database is queried by the rebalancing engine. In an example, the inode candidate database is populated by the rebalancing scanner based on, for example, a file system scan (that can be a full file system scan). In an example, as the rebalancing scanner encounters files it performs a deep inspection of the file metadata was well as the individual file blocks to determine if the file is an acceptable candidate for movement.

Various conditions, metrics and/or parameters can be utilized to determine if a file is an acceptable candidate for movement. Possible reasons for not being an acceptable candidate includes, for example, certain file types, whether the file is part of a snapshot, states of the file and/or various metrics that determine that moving the file would not result in a substantial enough improvement of the distributed file system. If a file is determined to be an acceptable candidate, it can be added to an ordered, queryable database that the rebalancing engine can use to find appropriate candidates to move. The rebalancing scanner can be driven multiple times for various reasons as the search for acceptable file candidates continues. Various details concerning the operation and architecture of example rebalancing scanners are provided below.

Instructions 812 cause processor(s) 822 to evaluate whether a candidate file is available. If a candidate file is not available, the container file distribution continues to be monitored (e.g., instructions 802). Upon a determination that candidate files are available, the movement of candidate files is triggered (e.g., instructions 814). In an example, movement of the files is controlled by the rebalancing engine and processed by a non-disruptive file movement mechanism.

Instructions 814 cause processor(s) 822 to trigger scanning of files on the local container. In an example, the rebalancing scanner (described in greater detail below) is responsible for performing potentially a full file system scan on its local container to search for file candidates to move. In an example, this scanning operation occurs in response to a trigger or other indication from the rebalancing engine. Thus, a scanning operation can be triggered at the time of the rebalancing engine querying for a file, for example. Triggering of a scan operation can also be based on additional factors as well including, for example, if a scan is already running, how long since the last scan, if the inode candidate database is empty, etc. In an example, as the rebalancing scanner encounters files it performs a deep inspection of the file metadata was well as the individual file blocks to determine if the file is an acceptable candidate for movement.

Various conditions, metrics and/or parameters can be utilized to determine if a file is an acceptable candidate for movement. Possible reasons for not being an acceptable candidate includes, for example, certain file types, whether the file is part of a snapshot, states of the file and/or various metrics that determine that moving the file would not result in a substantial enough improvement of the distributed file system. If a file is determined to be an acceptable candidate, it can be added to an ordered, queryable database that the rebalancing engine can use to find appropriate candidates to move. The rebalancing scanner can be driven multiple times for various reasons as the search for acceptable file candidates continues.

In an example, after one or more candidate files have been selected and before the one or more candidate files are moved, the rebalancing engine of the local container verifies with the rebalancing engine of the remote container that the storage capacity is still available. This check can be performed because conditions on the destination container could have changed since the original communication between the local rebalancing engine and the remote rebalancing engine determined a potential destination for files from the local container.

Instructions 816 cause processor(s) 822 to trigger scanning of files in the local container. As discussed above, in various examples, the rebalancing scanner scans the local file system in response to a trigger. A scan can be triggered, for example, by the rebalancing scanner in response to a detected need to rebalance files and/or periodically and independently the need to rebalance files. In some examples, the rebalancing engine can initiate scanning of the local file system.

Conceptually, the rebalancing engine performs the operations described without knowing what triggers a scan. In an example, in normal operation, the rebalancing engine queries the rebalancing scanner, which in turn queries the inode candidate database. With this information the rebalancing scanner can determine whether to trigger/initiate a scan. In other words, the query by the rebalancing engine can be the mechanism by which the rebalancing engine informs the rebalancing scanner that files should be moved for rebalancing purposes. The rebalancing scanner can use this information (i.e., the query from the rebalancing engine) to potentially start a new file system scan. In an example, the rebalancing scanner has its own logic to determine whether a new scan should be initiated, for example, if the inode candidate database is empty (or sufficiently empty) and/or how much time has passed since the beginning of the previous file system scan. Thus, in this example, the rebalancing engine does not determine whether the rebalancing scanner should run a file system scan. In an example, if the rebalancing scanner is never queried, the rebalancing scanner may never run a file system scan. Further, the rebalancing scanner can reply to the query from the rebalancing engine with a candidate file if one is available.

Instructions 818 cause processor(s) 822 to receive, retrieve and/or maintain parameters and/or characteristics used in association with file rebalancing as described herein. The parameters and/or characteristics can include one or more of Current Usage Size, Optimal Usage Size, Maximum Usage Size and/or Balancing Threshold. Additional and/or different parameters or characteristics can also be received, retrieved or maintained.

Figure 9:
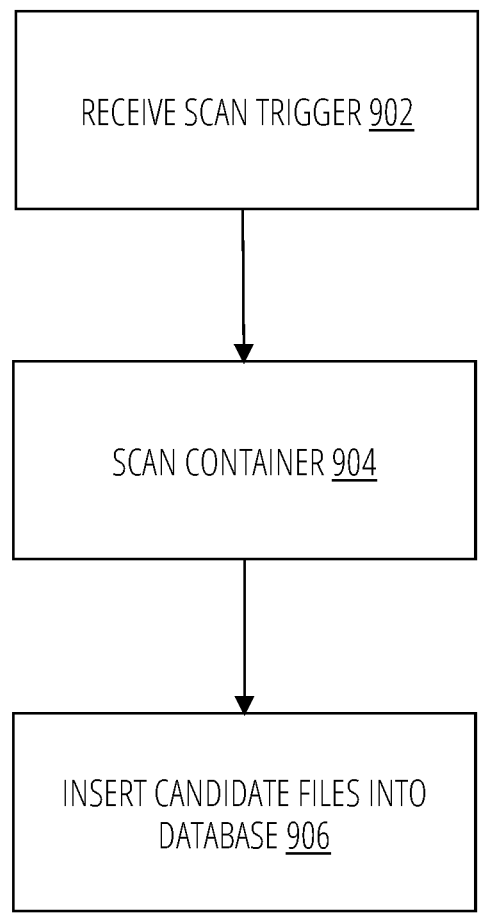
FIG. 9 is a flow diagram illustrating one embodiment of a process for scanning for candidate files for redistribution.

FIG. 9 is a flow diagram illustrating one embodiment of a process for scanning for candidate files for redistribution. One or more of the operations of FIG. 9 are performed by a rebalancing scanner (e.g., rebalancing scanner 416, rebalancing scanner 606) that can be communicatively coupled with, and work in coordination with, a rebalancing engine (e.g., rebalancing engine 414, rebalancing engine 604).

At block 902, a scan trigger is received from a rebalancing engine (e.g., rebalancing engine 604). As discussed above, the scan may be triggered by the rebalancing engine upon an unsuccessful query of the candidate database, or if sufficient time has passed since the previous scan has occurred a scan can be triggered either by the rebalancing engine or by an internal trigger within the rebalancing scanner.

At block 904, the container is scanned for candidate files. In an example, as the rebalancing scanner encounters files it performs a deep inspection of the file metadata was well as the individual file blocks to determine if the file is an acceptable candidate for movement. Various conditions, metrics and/or parameters can be utilized to determine if a file is an acceptable candidate for movement. Possible reasons for not being an acceptable candidate includes, for example, certain file types, whether the file is part of a snapshot, states of the file and/or various metrics that determine that moving the file would not result in a substantial enough improvement of the distributed file system. If a file is determined to be an acceptable candidate, it can be added to an ordered, queryable database that the rebalancing engine can use to find appropriate candidates to move. The rebalancing scanner can be driven multiple times for various reasons as the search for acceptable file candidates continues.

At block 906, candidate files are inserted into the ICDB database (e.g., inode candidate database 608). In an example, files that are part of a snapshot are not candidates to be moved. In an example, the rebalancing scanner is responsible for maintaining the candidate file database. In an example, when the rebalancing scanner needs to insert new entries into candidate database and candidate database has reached its capacity, the oldest entries are removed first to make space for the new entries. The rebalancing scanner may also remove entries having the largest file size upon determining that candidate database does not have a candidate whose file size is sufficiently small for the rebalancing engine to consume.

Figure 10:
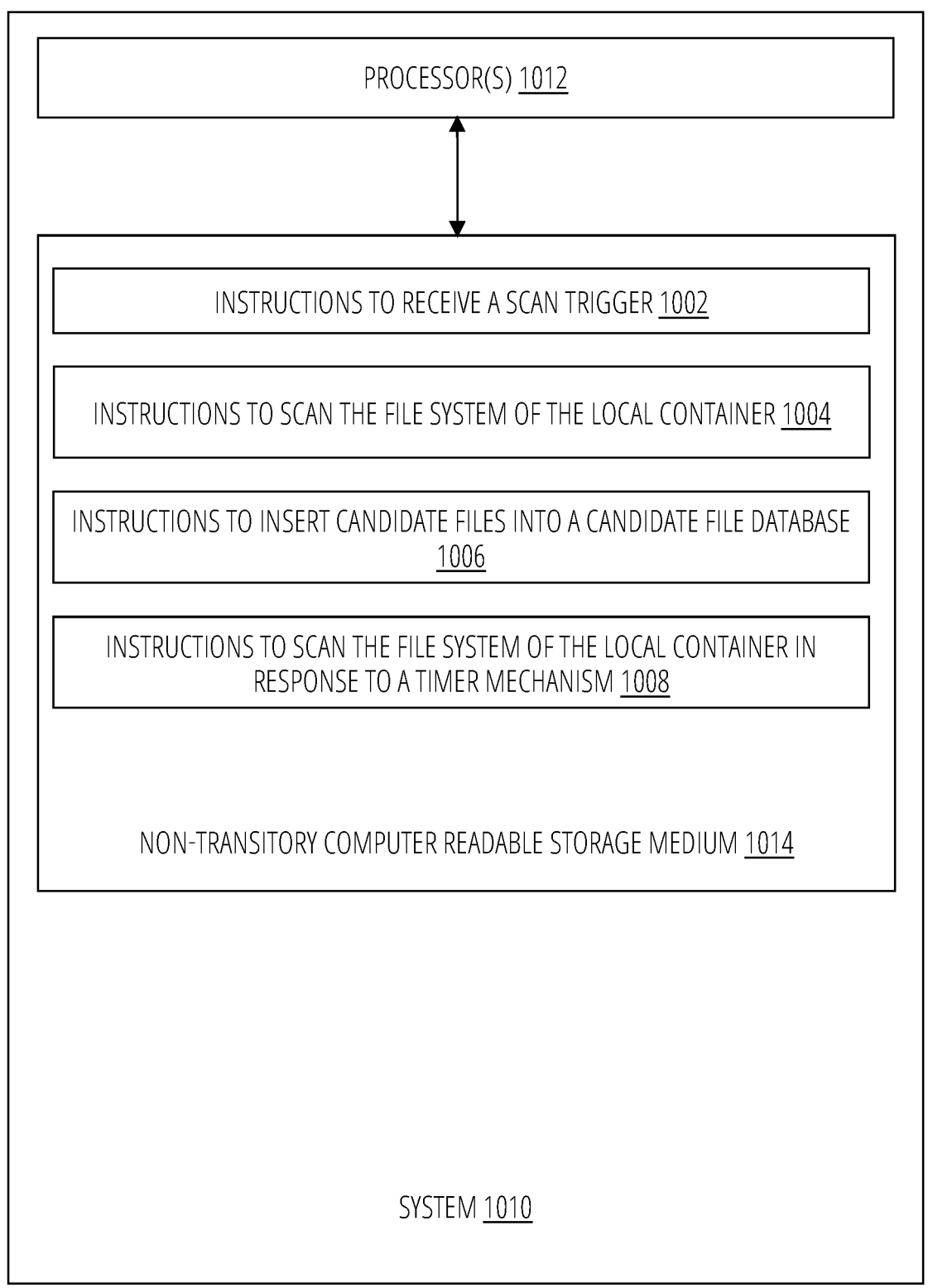
FIG. 10 is an example of a system to provide a process for performing file redistribution.

FIG. 10 is an example of a system to provide a process for performing file redistribution. In an example, system 1010 can include processor(s) 1012 and non-transitory computer readable storage medium 1014. In an example, processor(s) 1012 and non-transitory computer readable storage medium 1014 can be part of a node (e.g., node 200) having a storage operating system (e.g., storage operating system 210) that can provide some or all of the functionality of the ONTAP software as mentioned above. In an example, system 1010 can provide the functionality described herein with respect to the rebalancing scanner (e.g., rebalancing scanner 416, rebalancing scanner 606).

Non-transitory computer readable storage medium 1014 may store instructions 1002, 1004, 1006 and 1008 that, when executed by processor(s) 1012, cause processor(s) 1012 to perform various functions. Examples of processor(s) 1012 may include a microcontroller, a microcontroller, a microprocessor, a CPU, a GPU, a DPU, an ASIC, an FPGA, a SoC, etc. Examples of non-transitory computer readable storage medium 1014 include tangible media such as RAM, ROM, EEPROM, flash memory, a hard disk drive, etc.

Instructions 1002 cause processor(s) 1012 to receive a scan trigger. In an example, the scan trigger is received from a rebalancing engine (e.g., rebalancing engine 604). As discussed above, the scan may be triggered by, for example, a query from the rebalancing engine and/or if sufficient time has passed since the previous scan has occurred, a scan can be triggered either by the rebalancing scanner.

Instructions 1004 cause processor(s) 1012 to scan the file system of the local container. In an example, as the rebalancing scanner encounters files it performs a deep inspection of the file metadata was well as the individual file blocks to determine if the file is an acceptable candidate for movement. Various conditions, metrics and/or parameters can be utilized to determine if a file is an acceptable candidate for movement. Possible reasons for not being an acceptable candidate includes, for example, certain file types, whether the file is part of a snapshot, states of the file and/or various metrics that determine that moving the file would not result in a substantial enough improvement of the distributed file system. If a file is determined to be an acceptable candidate, it can be added to an ordered, queryable database that the rebalancing engine can use to find appropriate candidates to move. The rebalancing scanner can be driven multiple times for various reasons as the search for acceptable file candidates continues.

Instructions 1006 cause processor(s) 1012 to insert candidate files into a candidate file database. In an example, the rebalancing scanner is responsible for maintaining the candidate file database. In an example, when the rebalancing scanner needs to insert new entries into candidate database and candidate database has reached its capacity, the oldest entries are removed first to make space for the new entries. The rebalancing scanner may also remove entries having the largest file size upon determining that candidate database does not have a candidate whose file size is sufficiently small for the rebalancing engine to consume.

Instructions 1008 cause processor(s) 1012 to scan the file system of the local container in response to a timer mechanism. The periodic scanning of the file system in response to the timer mechanism can be in addition to, or instead of, scanning the file system in response to the trigger (e.g., instructions 1002).

Figure 11A:
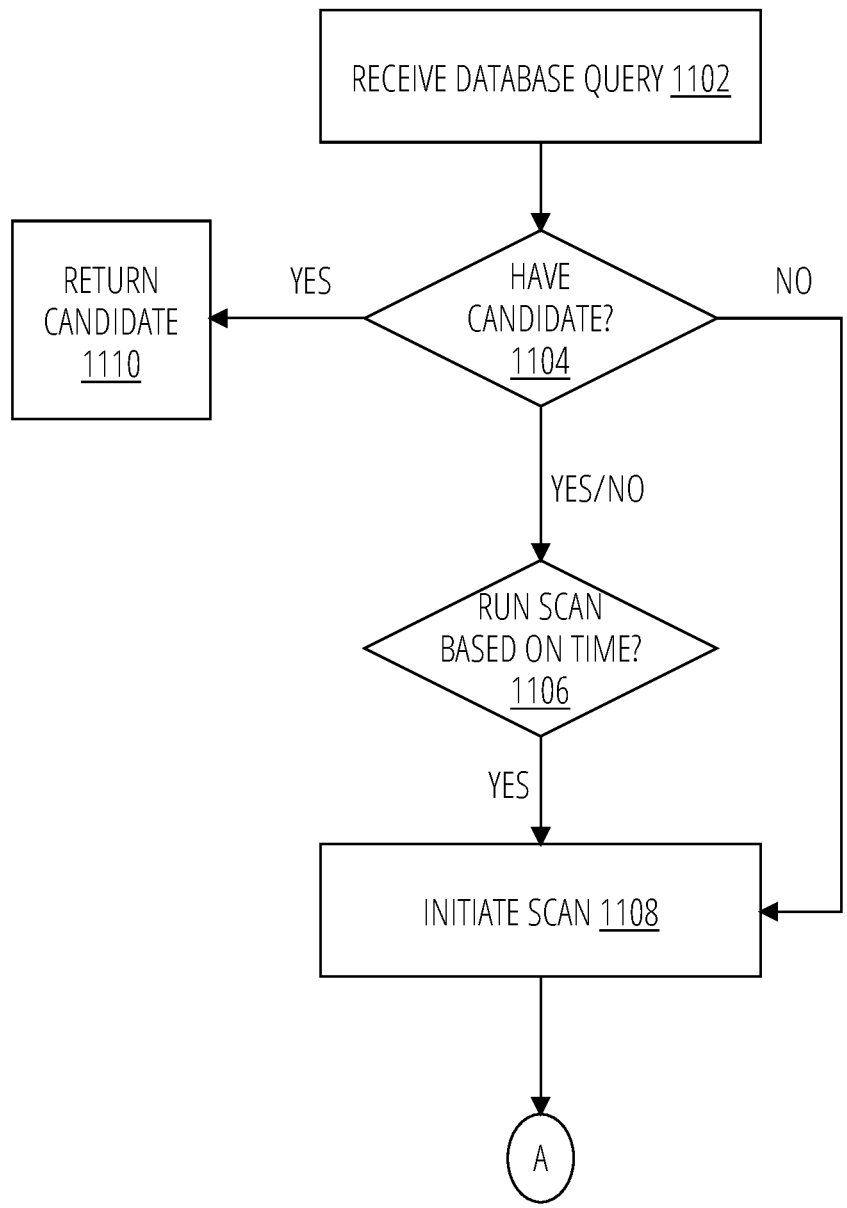
FIG. 11A is a first portion of a flow diagram illustrating one embodiment of a process for scanning for candidate files for redistribution.

FIG. 11A is a flow diagram illustrating one embodiment of a first portion of a process for scanning for candidate files for redistribution. One or more of the operations of FIG. 11A are performed by a rebalancing scanner (e.g., rebalancing scanner 416, rebalancing scanner 606) that can be communicatively coupled with, and work in coordination with, a rebalancing engine (e.g., rebalancing engine 414, rebalancing engine 604) and candidate file database (e.g., inode candidate database 608).

A query is received, at block 1102. In an example, the rebalancing engine queries the file candidate database (either directly or through the rebalancing scanner) to determine whether any acceptable candidate files have been identified and entered in the database.

If the database has one or more candidate files at decision block 1104, the candidate file(s) is/are returned, block 1110. In an example, the one or more candidate files are returned to the rebalancing engine; however, the one or more candidate files can also be returned to the rebalancing scanner to be transmitted to the rebalancing engine.

If the database does not have one or more candidate files at decision block 1104, a scan is initiated, block 1108. In one embodiment, the rebalancing scanner performs the scan by scanning inode files associated with the container; however, other file structures can also be supported.

In a further embodiment, scanner scans an inode buffer tree for every inode that is found. In yet a further embodiment, the rebalancing scanner performs an inspection of the file metadata as well as the individual file blocks upon encountering files to determine whether the file is a candidate file. In such an embodiment, the rebalancing scanner examines each file against one or more criteria and parameters to determine whether the file may be a candidate to be added to the database. Criteria may include parameters such as File Type, Minimum File Size, Maximum File Size and Storage Efficiency. A File Type criterion indicates whether a file is a type of file that is acceptable to be moved. For example, there are various file types that cannot be moved to another container.

In an example, whether or not a candidate file exists in the database, at decision block 1104, a scan can also be initiated (block 1108) based on time, decision block 1106. As discussed above, the periodic scanning of the file system in response to the timer mechanism (e.g., decision block 1106) can be in addition to, or instead of, scanning the file system in response to the scan based on the query (e.g., decision block 1104).

Figure 11B:
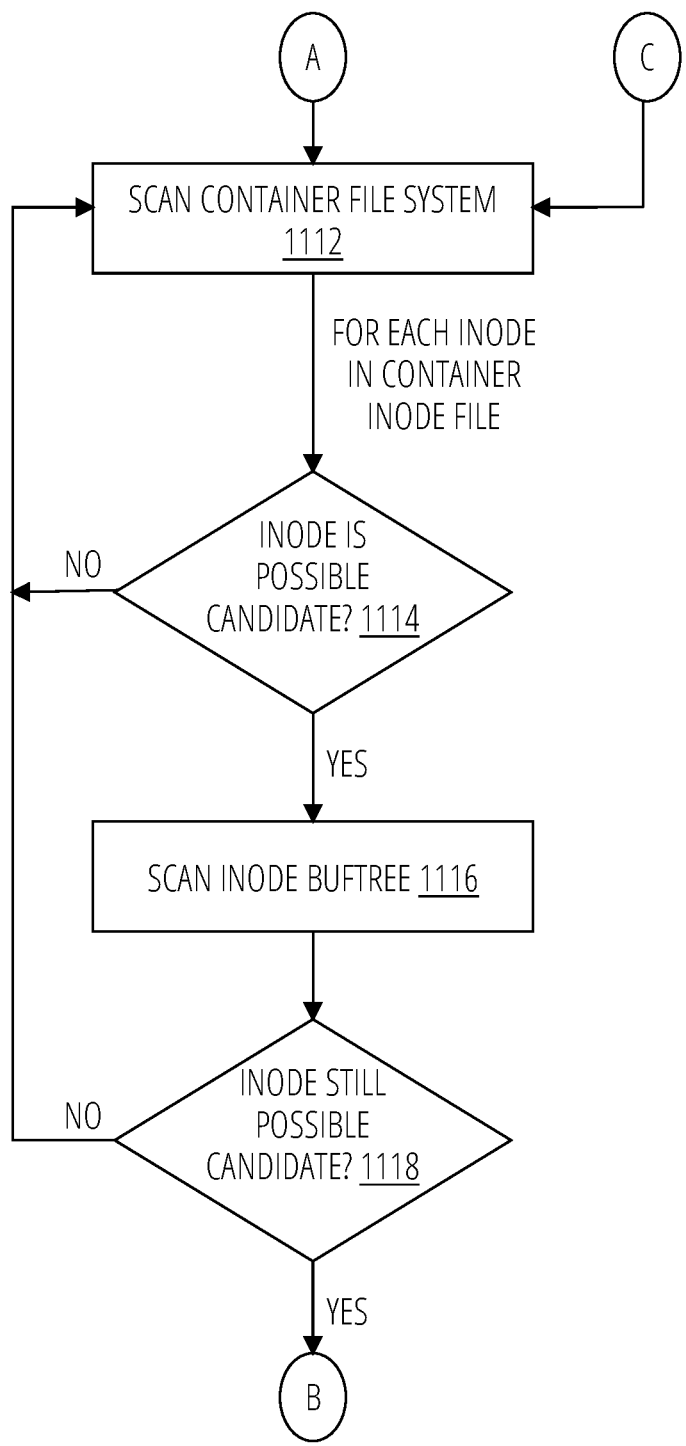
FIG. 11B is a second portion of a flow diagram illustrating one embodiment of a process for scanning for candidate files for redistribution.

FIG. 11B is a flow diagram illustrating one embodiment of a second portion of a process for scanning for candidate files for redistribution. One or more of the operations of FIG. 11B are performed by a rebalancing scanner (e.g., rebalancing scanner 416, rebalancing scanner 606) that can be communicatively coupled with, and work in coordination with, a rebalancing engine (e.g., rebalancing engine 414, rebalancing engine 604) and candidate file database (e.g., inode candidate database 608).

In response to initiation of the scan (i.e., block 1108 in FIG. 11A), the container file system is scanned, block 1112. In an example, the scan is performed by the rebalancing scanner. In an example, to perform the scan, for each inode in the container inode file, the rebalancing scanner determines if the subject inode is a possible candidate, decision block 1114.

Various parameters can be utilized to determine if a subject inode is a possible candidate. Different sets of parameters can be used in different situations, for example, depending on rebalancing parameters (e.g., Current Usage Size, Optimal Usage Size, Maximum Usage Size, Balancing Threshold).

If the subject inode is not a candidate at decision block 1114, the scanning process continues, block 1112. If the subject inode is a candidate at decision block 1114, the inode buftree is scanned block 1116. If the subject inode is not still a possible candidate after buftree scan, decision block 1118, the scanning process continues, block 1112.

Figure 11C:
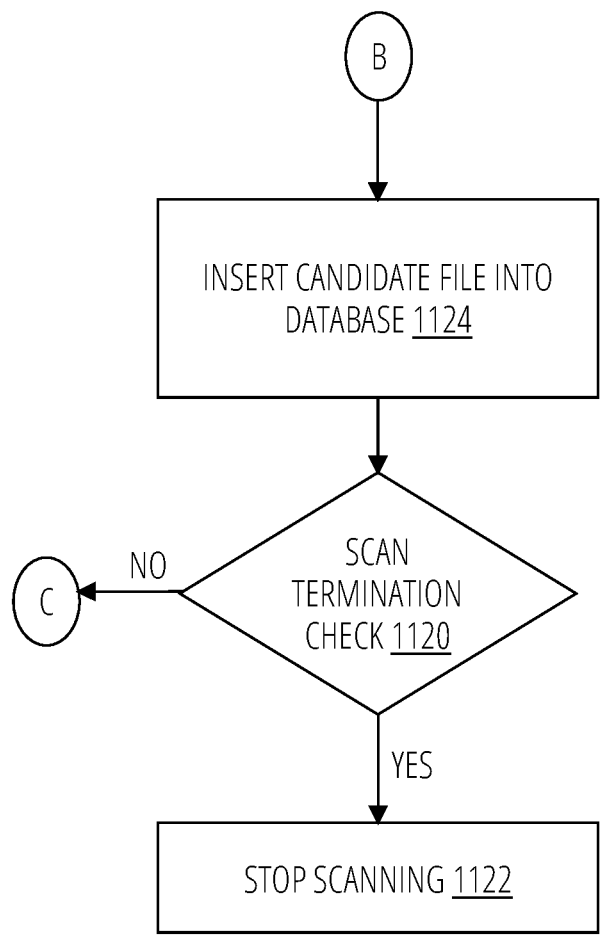
FIG. 11C is a third portion of a flow diagram illustrating one embodiment of a process for scanning for candidate files for redistribution.

FIG. 11C is a flow diagram illustrating one embodiment of a third portion of a process for scanning for candidate files for redistribution. One or more of the operations of FIG. 11C are performed by a rebalancing scanner (e.g., rebalancing scanner 416, rebalancing scanner 606) that can be communicatively coupled with, and work in coordination with, a rebalancing engine (e.g., rebalancing engine 414, rebalancing engine 604) and candidate file database (e.g., inode candidate database 608).

If the subject inode is not still a candidate after buftree scan, (decision block 1118 in FIG. 11B), a candidate file is inserted into the database, block 1124. If at, decision block 1120, evaluation of scan parameters (e.g., scan duration, number of files inserted in database, number of inodes scanned) determines the scanning should stop, then scanning stops, block 1122. If at, decision block 1120, evaluation of scan parameters (e.g., scan duration, number of files inserted in database, number of inodes scanned) determines the scanning should continue, decision block 1120, the scanning process continues, block 1112 (in FIG. 11B).

Figure 12:
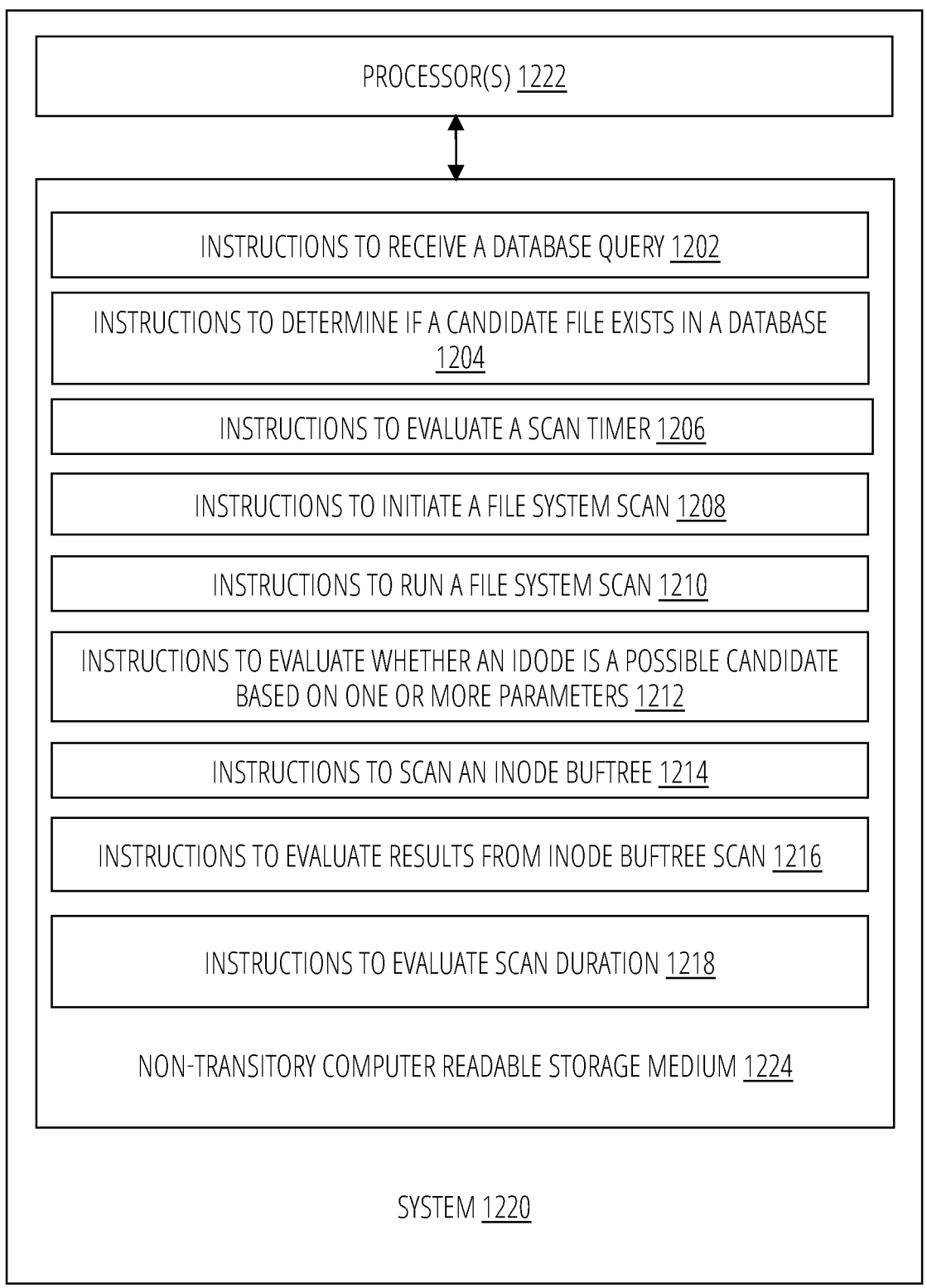
FIG. 12 is an example of a system to provide a process for performing file redistribution.

FIG. 12 is an example of a system to provide a process for performing file redistribution. In an example, system 1220 can include processor(s) 1222 and non-transitory computer readable storage medium 1224. In an example, processor(s) 1222 and non-transitory computer readable storage medium 1224 can be part of a node (e.g., node 200) having a storage operating system (e.g., storage operating system 210) that can provide some or all of the functionality of the ONTAP software as mentioned above. In an example, system 1220 can provide the functionality described herein with respect to the rebalancing engine (e.g., rebalancing engine 414, rebalancing engine 604).

Non-transitory computer readable storage medium 1224 may store instructions 1202, 1204, 1206, 1208, 1210, 1212, 1214, 1216 and 1218 that, when executed by processor(s) 1222, cause processor(s) 1222 to perform various functions. Examples of processor(s) 1222 may include a microcontroller, a microcontroller, a microprocessor, a CPU, a GPU, a DPU, an ASIC, an FPGA, an SoC, etc. Examples of non-transitory computer readable storage medium 1224 include tangible media such as RAM, ROM, EEPROM, flash memory, a hard disk drive, etc.

Instructions 1202 cause processor(s) 1222 to receive a database query. In an example, the rebalancing engine queries the file candidate database (either directly or through the rebalancing scanner) to determine whether any acceptable candidate files have been identified and entered in the database.

Instructions 1204 cause processor(s) 1222 to determine if the database has one or more candidate files, and if candidate one or more files are found in the database, the candidate file(s) is/are returned. In an example, the one or more candidate files are returned to the rebalancing engine; however, the one or more candidate files can also be returned to the rebalancing scanner to be transmitted to the rebalancing engine. If the database does not have one or more candidate files, a scan is initiated (e.g., instructions 1208 and 1210). In one embodiment, the rebalancing scanner performs the scan by scanning inode files associated with the container; however, other file structures can also be supported.

Instructions 1206 cause processor(s) 1222 to evaluate a scan timer. In an example, whether or not a candidate file exists in the database a scan can also be initiated based on time. The periodic scanning of the file system in response to the timer mechanism can be in addition to, or instead of, scanning the file system in response to the scan based on the query.

Instructions 1208 cause processor(s) 1222 to initiate a file system scan. The file system scan can be initiated by the rebalancing scanner in response to a query or other trigger from the rebalancing engine and/or in response to timer information.

Instructions 1210 cause processor(s) 1222 to run a file system scan. In an example, the rebalancing scanner performs the scan by scanning inode files associated with the container; however, other file structures can also be supported. In a further example, scanner scans an inode buffer tree for every inode that is found.

Instructions 1212 cause processor(s) 1222 to evaluate whether an inode is a possible candidate based on one or more parameters. In an example, the rebalancing scanner performs an inspection of the file metadata as well as the individual file blocks upon encountering files to determine whether the file is a candidate file.

Instructions 1214 cause processor(s) 1222 to scan an inode buftree. Instructions 1216 cause processor(s) 1222 to evaluate results from the inode buftree scan. In an example, the rebalancing scanner examines each file against one or more criteria and parameters to determine whether the file may be a candidate to be added to the database. Criteria may include parameters such as File Type, Minimum File Size, Maximum File Size and Storage Efficiency. A File Type criterion indicates whether a file is a type of file that is acceptable to be moved. For example, there are various file types that cannot be moved to another container.

Instructions 1218 cause processor(s) 1222 to evaluate the scan duration and/or parameters. If evaluation of scan parameters (e.g., scan duration, number of files inserted in database, number of inodes scanned) determines the scanning should stop, then scanning stops. If evaluation of scan parameters (e.g., scan duration, number of files inserted in database, number of inodes scanned) determines the scanning should continue, the scanning process continues (e.g., instructions 1210).

Embodiments may be implemented as any or a combination of one or more microchips or integrated circuits interconnected using a parent board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions in any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Reference in the specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment.

It is contemplated that any number and type of components may be added to and/or removed to facilitate various embodiments including adding, removing, and/or enhancing certain features. For brevity, clarity, and ease of understanding, many of the standard and/or known components, such as those of a computing device, are not shown or discussed here. It is contemplated that embodiments, as described herein, are not limited to any particular technology, topology, system, architecture, and/or standard and are dynamic enough to adopt and adapt to any future changes.

The terms "component", "module", "system," and the like as used herein are intended to refer to a computer-related entity, either software-executing general-purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device type, in accordance with the claimed subject matter.

What is claimed is:

1. A rebalancing engine in a local data container of a distributed file system having a plurality of data containers, each data container having its own rebalancing engine to facilitate rebalancing of files within the distributed file system, the rebalancing engine in the local data container to:
monitor characteristics associated with files stored in a local data container with respect to container-level parameters for the characteristics;
responsive to determining that the container-level parameters exceed one or more predetermined thresholds,
communicate with one or more remote rebalancing engines in remote data containers to determine a selected destination data container to which one or more files from the local data container are to be moved from the local data container;
generate a query to identify the one or more files from the local data container to be moved to the selected destination data container;
receive a response to the query indicating the one or more files to be moved from the local data container;
store results of the query indicating the one or more files to be moved in candidate database; and
cause movement of the one or more files as indicated by the candidate database to the selected data destination container, wherein the one or more files are stored in the selected destination container.

2. The rebalancing engine of claim 1, wherein determining whether the container-level parameters exceed one or more predetermined thresholds comprises determining if a current size of a file system of the first container is greater than an optimal usage size of the file system of the first container by determining whether an excess size of the file system of the first container is greater that the optimal usage size of the file system of the first container is greater than a threshold.

3. The rebalancing engine of claim 1, wherein the response to the query identifying the one or more files from the local container to be moved comprises identifiers corresponding to the one or more files from a candidate database.

4. The rebalancing engine of claim 1, further comprising transmitting the query to a rebalancing scanner in the local container, wherein the rebalancing scanner inserts entries for candidate files into a candidate file database based on analysis of metadata corresponding to the files of the local container.

5. The rebalancing engine of claim 1, further comprising selecting one or more files to transfer from a set of candidate files based at least on capacity available on the second container and a determination of storage capacity to be gained in the first container in response to movement of a selected file.

6. The method of claim 1, wherein the rebalancing engine of the local container shares file system characteristic information with at least one rebalancing engine of a remote container on a periodic schedule.

7. The rebalancing engine of claim 1, wherein the rebalancing engine determines one or more of:
an Optimal Usage Size, which refers to a preselected usage level corresponding to a storage capacity of a container;
a Current Usage Size, which refers to current storage capacity utilized by a container;
a Maximum Usage Size, which refers to a storage capacity value that is greater than the Optimal Usage Size and is used to trigger rebalancing operations; and
a Balancing Threshold, which refers to a threshold value that can be utilized to terminate rebalancing operations.

8. A non-transitory computer readable medium having stored thereon instructions that, when executed, cause a rebalancing engine in a local container of a distributed file system to facilitate rebalancing of files within the distributed file system, the instructions to cause the rebalancing engine to:
monitor characteristics associated with files stored in a local data container with respect to container-level parameters for the characteristics;
responsive to determining that the container-level parameters exceed one or more predetermined thresholds,
communicate with one or more remote rebalancing engines in remote data containers to determine a selected destination data container to which one or more files from the local data container are to be moved from the local data container;
generate a query to identify the one or more files from the local data container to be moved to the selected destination data container;
receive a response to the query indicating the one or more files to be moved from the local data container;
store results of the query indicating the one or more files to be moved in candidate database;
cause movement of the one or more files as indicated by the candidate database to the selected data destination container, wherein the one or more files are stored in the selected destination container.

9. The non-transitory computer readable medium of claim 8, wherein the instructions that cause the rebalancing engine to determine whether the container-level parameters exceed one or more predetermined thresholds comprises instructions that, when executed, cause the rebalancing engine to determine if a current size of a file system of the first container is greater than an optimal usage size of the file system of the first container by determining whether an excess size of the file system of the first container is greater that the optimal usage size of the file system of the first container is greater than a threshold.

10. The non-transitory computer readable medium of claim 8, wherein the response to the query identifying the one or more files from the local container to be moved comprises identifiers corresponding to the one or more files from a candidate database.

11. The non-transitory computer readable medium of claim 8, further comprising instructions that, when executed, cause the engine to transmit the query to a rebalancing scanner in the local container, wherein the rebalancing scanner inserts entries for candidate files into a candidate file database based on analysis of metadata corresponding to the files of the local container.

12. The non-transitory computer readable medium of claim 8, further comprising instructions that, when executed, cause the engine to select one or more files to transfer from a set of candidate files based at least on capacity available on the second container and a determination of storage capacity to be gained in the first container in response to movement of a selected file.

13. The non-transitory computer readable medium of claim 8, wherein the rebalancing engine of the local container shares file system characteristic information with at least one engine of a remote container on a periodic schedule.

14. The non-transitory computer readable medium of claim 8, wherein the rebalancing engine determines one or more of:
- an Optimal Usage Size, which refers to a preselected usage level corresponding to a storage capacity of a container;
- a Current Usage Size, which refers to current storage capacity utilized by a container;
- a Maximum Usage Size, which refers to a storage capacity value that is greater than the Optimal Usage Size and is used to trigger rebalancing operations; and
- a Balancing Threshold, which refers to a threshold value that can be utilized to terminate rebalancing operations.

15. A distributed file system comprising:
- a plurality of containers each having at least a rebalancing engine to facilitate rebalancing of files within the distributed file system and a scanner, each of the plurality of containers to store one or more files and each of the plurality of containers having corresponding container-level parameters for characteristics of files stored on the container;
- wherein a rebalancing first engine in a first container monitors characteristics associated with files stored in a local data container with respect to container-level parameters for the characteristics and, responsive to determining that the parameters for files on the first container exceed one or more predetermined thresholds, communicates with one or more remote rebalancing engines in remote data containers to determine a selected destination data container to which one or more files from the local data container are to be moved from the local data container and generates a query to identify the one or more files from the local data container to be moved to the selected destination data container;
- wherein a second rebalancing engine in a second container indicates to the first rebalancing engine in the first container whether the second container is available to receive one or more files from the first container;
- wherein the first rebalancing engine, responsive to an indication from the second rebalancing engine that the second container is available to receive one or more files from the first container, receives a response to the query indicating the one or more files to be moved from the local data container, stores results of the query indicating the one or more files to be moved in candidate database, and causes movement of the one or more files as indicated by the candidate database to the selected data destination container, wherein the one or more files are stored in the selected destination container.

16. The distributed file system of claim 15 wherein the container-level parameters comprise one or more of:
- an Optimal Usage Size, which refers to a preselected usage level corresponding to a storage capacity of a container;
- a Current Usage Size, which refers to current storage capacity utilized by a container;
- a Maximum Usage Size, which refers to a storage capacity value that is greater than the Optimal Usage Size and is used to trigger rebalancing operations; and
- a Balancing Threshold, which refers to a threshold value that can be utilized to terminate rebalancing operations.

17. The distributed file system of claim 15 further comprising selecting one or more files to transfer from a set of candidate files based at least on capacity available on the second container and a determination of storage capacity to be gained in the first container in response to movement of a selected file.

18. The distributed file system of claim 15 wherein the first rebalancing engine transmits the query to a rebalancing scanner in the local container, wherein the rebalancing scanner inserts entries for candidate files into a candidate file database based on analysis of metadata corresponding to the files of the local container.

19. The distributed file system of claim 15 wherein the first rebalancing engine of the first container shares file system characteristic information with at least the second rebalancing engine on a periodic schedule.

20. The distributed file system of claim 15 wherein determining whether the container-level parameters exceed one or more predetermined thresholds comprises determining if a current size of a file system of the first container is greater than an optimal usage size of the file system of the first container by determining whether an excess size of the file system of the first container is greater that the optimal usage size of the file system of the first container is greater than a threshold.

* * * * *